US010012770B2

(12) United States Patent
Fukuda et al.

(10) Patent No.: US 10,012,770 B2
(45) Date of Patent: Jul. 3, 2018

(54) OPTICAL FILM, METHOD OF MANUFACTURING THE SAME, POLARIZING PLATE AND LIQUID CRYSTAL DISPLAY DEVICE

(71) Applicant: FUJIFILM Corporation, Tokyo (JP)

(72) Inventors: Kenichi Fukuda, Kanagawa (JP); Miho Asahi, Kanagawa (JP); Yutaka Nozoe, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 370 days.

(21) Appl. No.: 14/812,477

(22) Filed: Jul. 29, 2015

(65) Prior Publication Data
US 2015/0331151 A1    Nov. 19, 2015

Related U.S. Application Data

(63) Continuation of application No. PCT/JP2014/051546, filed on Jan. 24, 2014.

(30) Foreign Application Priority Data

Feb. 1, 2013   (JP) .................................. 2013-019006
Feb. 28, 2013  (JP) .................................. 2013-039688
Apr. 24, 2013  (JP) .................................. 2013-091812

(51) Int. Cl.
| | | |
|---|---|---|
| G02F 1/1335 | (2006.01) | |
| G02B 1/14 | (2015.01) | |
| G02B 1/10 | (2015.01) | |
| G02B 5/30 | (2006.01) | |
| C08J 5/18 | (2006.01) | |
| B32B 27/00 | (2006.01) | |
| G02B 1/04 | (2006.01) | |
| C08J 7/04 | (2006.01) | |

(52) U.S. Cl.
CPC ............... G02B 1/10 (2013.01); B32B 27/00 (2013.01); C08J 5/18 (2013.01); C08J 7/047 (2013.01); G02B 1/04 (2013.01); G02B 1/14 (2015.01); G02B 5/3033 (2013.01); G02F 1/133528 (2013.01); C08J 2333/12 (2013.01); C08J 2335/02 (2013.01); C08J 2435/02 (2013.01); G02B 5/30 (2013.01); Y10T 428/10 (2015.01); Y10T 428/31844 (2015.04); Y10T 428/31848 (2015.04)

(58) Field of Classification Search
CPC ... G02B 1/04; G02B 1/14; G02B 5/30; G02B 5/3033; C08L 23/18; C08J 2333/12; C08J 2335/02; C08J 2435/02; C08J 5/18; C08J 7/047; G02F 1/133528; Y10T 428/105; Y10T 428/31844; Y10T 428/31848
USPC ....................................................... 428/1.33
See application file for complete search history.

(56) References Cited

U.S. PATENT DOCUMENTS

| | | | |
|---|---|---|---|
| 2001/0040565 A1 | 11/2001 | Koyama | |
| 2002/0086163 A1 | 7/2002 | Shimizu et al. | |
| 2002/0160172 A1 | 10/2002 | Shimizu et al. | |
| 2008/0239211 A1* | 10/2008 | Suzuki | G02B 5/3016 349/96 |
| 2009/0099308 A1 | 4/2009 | Takebe et al. | |
| 2009/0153965 A1* | 6/2009 | Ito | G02B 1/105 359/489.2 |
| 2010/0182689 A1 | 7/2010 | Nakanishi et al. | |
| 2010/0202051 A1 | 8/2010 | Yoshimi et al. | |
| 2012/0010341 A1 | 1/2012 | Meta et al. | |
| 2012/0309873 A1* | 12/2012 | Ogawa | C09J 133/08 524/106 |

FOREIGN PATENT DOCUMENTS

| | | | |
|---|---|---|---|
| JP | H11-216817 A | | 8/1999 |
| JP | 2002-146044 A | | 5/2002 |
| JP | 2003-183417 A | | 7/2003 |
| JP | 2006-083225 A | | 3/2006 |
| JP | 2006083225 A | * | 3/2006 |
| JP | 2006-292834 A | | 10/2006 |
| JP | 2007-119720 A | | 5/2007 |
| JP | 2008-094869 A | | 4/2008 |
| JP | 2010-254890 A | | 11/2010 |
| JP | 2010254890 A | * | 11/2010 |
| JP | 2011-100161 A | | 5/2011 |
| JP | 2011-215638 A | | 10/2011 |
| KR | 2011-0106469 A | | 9/2011 |
| KR | 2011-0114472 A | | 10/2011 |
| WO | 2009/047924 A1 | | 4/2009 |
| WO | 2010-110254 A1 | | 9/2010 |
| WO | 2012/020750 A1 | | 2/2012 |

OTHER PUBLICATIONS

Notification of Reasons for Refusal issued by the Japanese Patent Office dated Apr. 18, 2017, in connection with Japanese Patent Application No. 2014-559656.
International Preliminary Report on Patentability issued by WIPO dated Aug. 4, 2015 in connection with International Patent Application No. PCT/JP2014/051546.
Notification of Reason for Refusal issued by the Korean Intellectual Property Office dated May 11, 2017, in connection with Korean Patent Application No. 10-2015-7020600.
Office Action, issued by the Japanese Patent Office (JPO) dated Aug. 9, 2016, in connection with corresponding Japanese Patent Application No. 2014-559656.
International Search Report dated Apr. 28, 2014 in connection with Application No. PCT/JP2014/051546.
Written Opinion dated Apr. 28, 2014 in connection with Application No. PCT/JP2014/051546.

* cited by examiner

*Primary Examiner* — Sophie Hon
(74) *Attorney, Agent, or Firm* — Edwards Neils LLC; Jean C. Edwards, Esq.

(57) ABSTRACT

There is provided an optical film comprising a layer formed on a base film by curing a curable composition containing the specific component (A) in an amount of 50 to 99% by mass and the specific component (B) in an amount of 1 to 50% by mass, based on the total solid content of the curable composition when the total solid content of the curable composition is set to 100% by mass.

10 Claims, No Drawings

OPTICAL FILM, METHOD OF MANUFACTURING THE SAME, POLARIZING PLATE AND LIQUID CRYSTAL DISPLAY DEVICE

CROSS REFERENCE TO RELATED APPLICATION

This is a continuation of International Application No. PCT/JP2014/051546 filed on Jan. 24, 2014, which was published under PCT Article 21(2)in Japanese, and claims priority from Japanese Patent Application No. 2013-019006 filed on Feb. 1, 2013, Japanese Patent Application No. 2013-039688 filed on Feb. 28, 2013, and Japanese Patent Application No. 2013-091812 filed on Apr. 24, 2013, the entire disclosures of all of which are incorporated herein by reference in their entirety.

TECHNICAL FIELD

The present invention relates to an optical film, a method of manufacturing the same, a polarizing plate and a liquid crystal display device.

BACKGROUND ART

Recently, liquid crystal display devices have been widely used in liquid crystal panels for liquid crystal TVs or PCs, mobile phones, digital cameras, etc. Conventionally, a liquid crystal display device is provided with a liquid crystal panel member having polarizing plates on both sides of a liquid crystal cell and enables a display by controlling light from a backlight member by the liquid crystal panel member. In this case, the polarizing plate is provided with a polarizer and protective films on both sides of the polarizer. A conventional polarizer is obtained by dyeing a stretched polyvinyl alcohol (PVA) film with iodine or a dichroic pigment, and as a protective film, a cellulose ester film or the like has been used.

Recent liquid crystal display devices have been diversified in use thanks to high quality, and the requirements for durability have become stricter. For example, for outdoor use, it is required to maintain stability in response to an environmental change. As for an optical film, such as the above-described protective film for a polarizing plate used in a liquid crystal display device or an optical compensation film, it is also required to prevent dimensional or optical characteristics from changing in response to a change in temperature or moisture.

Since liquid crystal displays have been made to be used under more harsh conditions, such as outdoor uses, as well as conventional indoor uses, the performance of moisture impermeability in an optical film provided at the outermost surface of a liquid crystal display device has become more important. Also, when used in TVs, which have recently become bigger, this performance may be affected by a trend in which the glass of the liquid crystal cell tends to become thinner. Thus, there are concerns for the tendency of warpage increase and the influence on light leakage occurring over time under a high-temperature high-humidity condition.

Patent Document 1 discloses an optical film, in which a large quantity of acrylic resin, such as polymethyl methacrylate (PMMA), is added to cellulose ester, in order to provide an optical film having a high transparency, a low moisture absorbability, a high thermal resistance and a high mechanical strength.

Also, a film provided with a coating layer on a base film has also been known. For example, Patent Document 2 discloses a film in which on a cellulose acylate base film having a film thickness of 80 μm, a coating layer formed of a composition containing a compound having a cycloaliphatic hydrocarbon group and two or more ethylenically unsaturated double bonds in a molecule.

PRIOR ART DOCUMENTS

Patent Documents

Patent Document 1: International Publication No. WO 2009/047924
Patent Document 2: JP Publication No. 2006-A-83225

SUMMARY OF INVENTION

Problems to be Solved

For small and medium-sized appliances, such as recently rapidly spreading tablet PCs or mobiles, there has been a high demand for thinner films or space savings in liquid crystal display devices. Thus, it has also been strongly required to resolve the problem of light leakage occurring over time under a high-temperature high-humidity condition. Regarding the occurrence of warpage in a liquid crystal cell or light leakage in a liquid crystal layer, it has been regarded that a liquid crystal cell in a liquid crystal display device warps due to the loss of balance between polarizing plates provided on the front surface and back surface of the liquid crystal cell when the polarizing plates have a difference in shrinkage therebetween as a result of moisture absorption or discharge by the polarizing plates and optical films forming the same and particularly by polarizers, and light leakage occurs when the 4 corners or 4 edges of the liquid crystal cell come into contact with a housing or a member on the back surface side. Thus, polarizing plate protecting films there have been required to be improved in terms of humidity-dependency or moisture and heat-resistance. To achieve more drastic improvement, however, it is necessary to prevent the absorption or discharge of moisture caused by an environmental change, and in particular, a reduction in moisture permeability is more required in an optical film provided at the outermost surface of the polarizing plate.

In consideration of the foregoing circumstances, an object of the present invention, that is, an object to be solved by the present invention is to provide an optical film with a reduced moisture permeability and a method of manufacturing the same.

Another object of the present invention is to provide a polarizing plate using the optical film described above. A further object of the present invention is to provide a liquid crystal display device improved for light leakage occurring over time under a high-temperature high-humidity environment.

Means for Solving the Problems

As a result of a close study, the inventors of the present invention discovered that it is possible to provide an optical film with a reduced moisture permeability and, by using such an optical film, it is possible to provide a liquid crystal display device improved for light leakage occurring over time under a high-humidity condition, and finally reached the present invention.

The object to be solved by the present invention can be solved by the present invention that is the means described below.

[1] An optical film comprising a layer formed on a base film by curing a curable composition containing the following (A) in an amount of 50 to 99% by mass and the following (B) in an amount of 1 to 50% by mass, based on the total solid content of the curable composition when the total solid content of the curable composition is set to 100% by mass:

(A) at least one of a compound having a cycloaliphatic hydrocarbon group and an ethylenically unsaturated double bond and a compound having a fluorene ring and an ethylenically unsaturated double bond, (B) a rosin compound.

[2] The optimal film as described in [1],
wherein the cycloaliphatic hydrocarbon group is represented by the following Formula (I):

[Chem. 1]

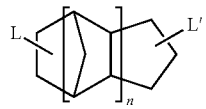

(I)

in Formula (I),
each of L and L' independently represents a di- or higher-valent linking group, and
n represents an integer of 1 to 3.

[3] The optical film as described in [1] or [2],
wherein the rosin compound is at least one rosin compound selected from a rosin, a hydrogenated rosin, an acid-modified rosin, and an esterified rosin.

[4] The optical film as described in any one of [1] to [3],
wherein the rosin compound is an acid-modified rosin.

[5] The optical film as described in any one of [1] to [4],
wherein the optical film has a moisture permeability of 5.0 to 100 g/m²/day,
the moisture permeability of the optical film is a value obtained according to a method described in JIS Z-0208 after the lapse of 24 hours under a temperature of 40° C. and a relative humidity of 90%.

[6] The optical film as described in any one of [1] to [5],
wherein a moisture permeability of the layer containing (A) and (B) is from 5.0 to 100 g/m²/day,
the moisture permeability is a value obtained according to a method described in JIS Z-0208 after the lapse of 24 hours under a temperature of 40° C. and a relative humidity of 90%, and the moisture permeability of the layer containing (A) and (B) is calculated by the following Equation (1):

$$1/J_f = 1/J_s + 1/J_b$$ Equation (1)

in Equation (1),
$J_b$ represents the moisture permeability of the layer when the optical film is separated into the base film and the layer containing (A) and (B), the moisture permeability of the optical film is denoted as $J_f$ and the moisture permeability of the base film is denoted as $J_s$.

[7] The optical film as described in any one of [1] to [6],
wherein when the layer containing (A) and (B) has a film thickness of 10 μm, a converted moisture permeability of the layer containing (A) and (B) ranges from 5.0 to 100 g/m²/day, the moisture permeability is a value obtained according to a method described in JIS Z-0208 after the lapse of 24 hours under a temperature of 40° C. and a relative humidity of 90%, the moisture permeability of the layer containing (A) and (B) and having a film thickness of 10 μm is calculated by the following Equation (2):

$$J_b \times d_b/10$$ Equation (2)

in Equation (2),
$J_b$ represents the moisture permeability of the layer when the optical film is separated into the base film and the layer containing (A) and (B), and
$d_b$ [μm] is a film thickness of the low moisture-permeable layer.

[8] The optical film as described in any one of [1] to [7], wherein the base film is a cellulose acylate film.

[9] The optical film as described in any one of [1] to [7], wherein the base film is a (meth)acrylic polymer having at least one of a lactone ring structure, an anhydrous glutaric acid ring structure and a glutarimide ring structure in its main chain.

[10] The optical film as described in any one of [1] to [9], further comprising a hard coat layer on the layer containing (A) and (B).

[11] A method of manufacturing an optical film, comprising forming a layer on a base film by curing a curable composition containing the following (A) and (B):

(A) at least one of a compound having a cycloaliphatic hydrocarbon and an ethylenically unsaturated double bond and a compound having a fluorene ring and an ethylenically unsaturated double bond in an amount of 50 to 99% by mass, based on the total solid content of the curable composition when the total solid content of the curable composition is set to 100% by mass, (B) a rosin compound in an amount of 1 to 50% by mass, based on the total solid content of the curable composition.

[12] A polarizing plate comprising:
a polarizer, and
an optical film described in any one of [1] to [10] as a protective film for the polarizer.

[13] A liquid crystal display device comprising:
a liquid crystal cell and
a polarizing plate described in [12], which is disposed at least one side of the liquid crystal cell,
wherein the optical film is arranged such that it becomes the outermost surface layer.

Advantage of Invention

According to the present invention, it is possible to provide an optical film with a reduced moisture permeability and a method of manufacturing the same. By using the optical film according to the present invention, it is possible to provide a liquid crystal display device in which light leakage occurring over time under a high-temperature high-moisture condition is prevented.

MODE FOR CARRYING OUT THE INVENTION

Hereinafter, the optical film and the method of manufacturing the same according to the present invention and additives used therein will be described in detail.

The compositional requirements for the invention may be described below based on representative embodiments of the present invention, but the present invention is not limited thereto. Also, a numerical range represented using the dash "to" means a range having the numerical values coming before and after "to" as the lower limiting value and the upper limiting value, respectively.

The term "acrylic resin" is used to mean a resin obtained by polymerizing a derivative from a methacrylic acid or an acrylic acid and a resin containing the derivative. Unless otherwise specifically defined, the term "(meth)acrylate" refers to acrylate and methacrylate, and the term "(meth)acryl" refers to acryl and methacryl.

Also, the "slow axis direction" of the film means an in-plane direction in which the refractive index reaches the maximum value, and the "fast axis direction" means an in-plane direction orthogonal to the slow axis.

[Optical Film and Method of Manufacturing the Same]

The optical film of the present invention is provided on its base film with a layer formed by curing a curable composition containing (A) described below in an amount of 50 to 99% by mass and (B) described below in an amount of 1 to 50% by mass, based on the total solid content of the curable composition when the total solid content of the curable composition is set to 100% by mass (hereinafter, this layer is also referred to as a "low moisture-permeable layer").

Herein, the total solid content of the curable composition means all of the components of the curable composition, except a solvent:

(A) at least one of a compound having a cycloaliphatic hydrocarbon group and an ethylenically unsaturated double bond and a compound having a fluorene ring and an ethylenically unsaturated double bond, and (B) a rosin compound.

In the present invention, a low moisture-permeable layer means a layer formed by curing a curable composition containing (A) described above in an amount of 50 to 99% by mass and (B) described above in an amount of 1 to 50% by mass, based on the total solid content when the total solid content of the curable composition is set to 100% by mass.

The degree of moisture in the low moisture-permeable layer, which is represented per unit film thickness of 10 μm, is preferably 5.0 to 250 g/m$^2$/day, more preferably 5.0 to 100 g/m$^2$/day, and particularly preferably 5.0 to 100 g/m$^2$/day.

The present invention also relates to a method of manufacturing the optical film described above.

The method of manufacturing the optical film in the present invention has a step of forming a low moisture-permeable layer on a base film by curing a curable composition containing (A) described above in an amount of 50 to 99% by mass and (B) described above in an amount of 1 to 50% by mass, based on the total solid content when the total solid content of the curable composition is set to 100% by mass.

(Moisture Permeability of Optical Film)

The optical film according to the present invention contains (A) and (B) in the respective amounts described above in a low moisture-permeable layer to achieve a remarkable reduction in moisture permeability by the synergistic effect of (A) and (B), thereby resulting in excellent durability and reduced moisture permeability.

The optical film of the present invention preferably has a moisture permeability of ranging from 5.0 to 100 g/m$^2$/day (herein, the moisture permeability means a value obtained according to a method described in JIS Z-0208 after the lapse of 24 hours under a temperature of 40° C. and a relative humidity of 90%). The moisture permeability of the optical film according to the present invention is preferably 90 g/m$^2$/day or less, more preferably 80 g/m$^2$/day or less, still more preferably 70 g/m$^2$/day or less, and particularly preferably 60 g/m$^2$/day or less. As long as the moisture permeability is kept at 100 g/m$^2$/day or less, it is possible to prevent light leakage involved in the warpage of a liquid crystal cell in a liquid crystal display device over time under a normal temperature condition and a high-humidity condition and a high-temperature high-humidity condition.

{Low Moisture Permeable Layer}

The low-moisture permeable layer in the optical film of the present invention contains (A) at least one of a compound having a cycloaliphatic hydrocarbon and an ethylenically unsaturated double bond and a compound having a fluorene ring and an ethylenically unsaturated double bond in an amount of 50 to 99% by mass and (B) a rosin compound in an amount of 1 to 50% by mass. According to needs, it is possible to form a low-moisture permeable layer by applying a curable composition containing a polymerization initiator, a light transmissive particle, a fluorine-containing or silicon-based compound and a solvent on a base film directly or through another layer, and drying and curing the applied composition. In the following, each of these compounds will be described.

[Compound Having a Cycloaliphatic Hydrocarbon Group and an Ethylenically Unsaturated Double Bond]

A compound having a cycloaliphatic hydrocarbon group and an ethylenically unsaturated double bond may function as a binder.

As a result of achieving low moisture permeability by using a compound having a cycloaliphatic hydrocarbon group and an ethylenically unsaturated double bond, it is possible to provide excellent adhesion between a base film or another layer and a low moisture permeable layer and to prevent light leakage in a polarizing plate. Although it is not known in detail, using a compound containing a cycloaliphatic hydrocarbon group in a molecule makes it possible to introduce a hydrophobic cycloaliphatic hydrocarbon group into the low moisture permeable layer to make the low moisture permeable layer hydrophobic, thereby preventing the introduction of molecules from outside and reducing moisture permeability. Further, the containment of an ethylenically unsaturated double bond in a molecule increases the cross-link density to restrict the proliferation path of water molecules in the low moisture permeable layer. The increase in crosslink density has also an effect in relatively increasing the density of the cycloaliphatic hydrocarbon group, and is thus considered to make the inside of the low moisture permeable layer more hydrophobic and prevent the absorption of water molecules, thereby reducing moisture permeability.

In order to increase the crosslink density, it is more preferable to contain two or more ethylenically unsaturated bonds in a molecule.

A cycloaliphatic hydrocarbon group is preferably a group derived from an alicyclic compound having 7 or more carbon atoms, more preferably a group derived from an alicyclic compound having 10 or more carbon atoms, and still more preferably a group derived from an alicyclic compound having 12 or more carbon atoms.

A cycloaliphatic hydrocarbon group is particularly preferably a group derived from a polycyclic compound, such as a bicyclic compound and a tricyclic compound.

The central skeleton of the compounds described in the claims of Japanese Patent Application Laid-Open No. 2006-215096, the central skeleton of the compounds described in Japanese Patent Application Laid-Open No. 2001-10999, the central skeleton of an adamantane derivative and the like are more preferred.

Specific examples of a cycloaliphatic hydrocarbon group include a norbornyl group, a tricyclodecanyl group, a tetracyclododecanyl group, a pentacyclopentadiene decanyl group, an adamantane group, a di-adamantane group and the like.

As a cycloaliphatic hydrocarbon group (including a linking group), a group represented by any of the following Formulas (I) to (V) is preferred, a group represented by the following Formula (I), (II) or (IV) is more preferred, and a group represented by the following Formula (I) is still more preferred.

[Chem. 2]

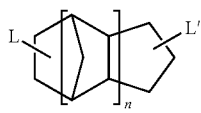
(I)

In Formula (I), each of L and L' independently represents a single bond or a di- or higher-valent linking group.

[Chem. 3]

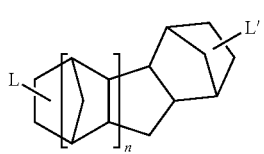
(II)

In Formula (II), each of L and L' independently represents a single bond or a di- or higher-valent linking group. n represents an integer of 1 to 2.

[Chem. 4]

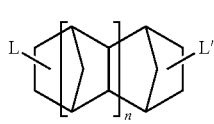
(III)

In Formula (III), each of L and L' independently represents a single bond or a di- or higher-valent linking group. n represents an integer of 1 to 2.

[Chem. 5]

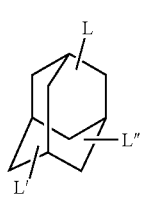
(IV)

In Formula (IV), each of L and L' independently represents a single bond or a di- or higher-valent linking group, and L' represents a hydrogen atom, a single bond or a di- or higher-valent linking group.

[Chem. 6]

(V)

In Formula (V), each of L and L' independently represents a single bond or a divalent or higher-valent linking group.

Examples of the di- or higher-valent linking group represented by L, L' and L" may include an alkylene group that may be substituted and has 1 to 6 carbon atoms, an amid bond that may be substituted at the N site, a urethane bond that may be substituted at the N site, an ester bond, an oxycarbonyl group, an ether bond and the like, and a group obtained by combining two or more thereof.

Examples of an enthylenically unsaturated double bond may include polymerizable functional groups, such as a (meth)acryloyl group, a vinyl group, a styryl group and an allyl group. Among others, a (meth)acryloyl group and —C(O)OCH=$CH_2$ are preferred. More preferably, compounds containing two or more (meth)acryloyl groups in one molecule, as illustrated later in M-1 to M-4, may be used.

A compound containing a cycloaliphatic hydrocarbon group and two or more ethylenically unsaturated double bonds in a molecule may be constituted by bonding the cycloaliphatic hydrocarbon group and the group having an ethylenically unsaturated double bond via a linking group.

These compounds may be readily synthesized by a single-step or two-step reaction of a polyol having the cycloaliphatic hydrocarbon group described above, such as diol and triol, with a carboxylic acid of a compound having a (meth)acryloyl group, a vinyl group, a styryl group, an allyl group and the like, a carboxylic derivative, an epoxy derivative, an isocyanate derivative and the like.

Preferably, the synthesis may be performed by reacting a compound, such as a (meth)acrylic acid, (meth)acryloylchloride, (meth)acrylic anhydride or (meth)acrylicglycydyl, or a compound described in WO 2012/00316A (e.g., 1,1-bis(acryloxymethyl)ethylisocyanate) with a polyol having the above-described cycloaliphatic hydrocarbon group.

In the following, preferred specific examples of a compound having a cycloaliphatic hydrocarbon group and an ethylenically unsaturated double bond will be represented, but the present invention is not limited thereto.

[Chem. 7]

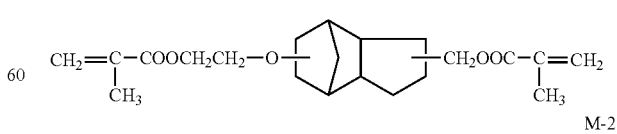
M-1

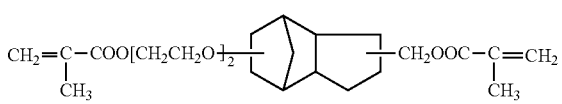
M-2

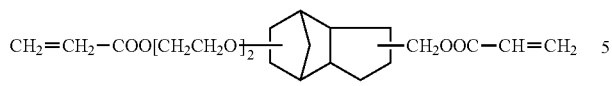
M-3

[Chem. 8]

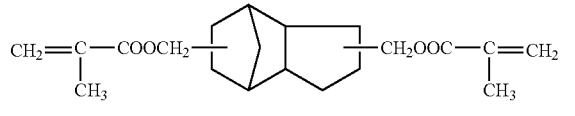
M-4

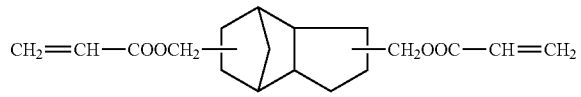
M-5

[Chem. 10]

-continued

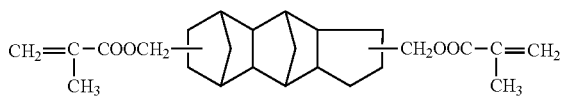
M-6

[Compound Having a Fluorene Ring and an Ethylenically Unsaturated Double Bond]

As a compound which may be contained in a low moisture permeable layer, a compound having a fluorene ring and an ethylenically unsaturated double bond may function as a binder. Also, the compound having a fluorene ring and an ethylenically unsaturated double bond may function as a curing agent and is able to improve the strength or scratch-resistance of a coated layer and simultaneously give low moisture permeability.

In order to increase the crosslink density, it is more preferable to contain two or more ethylenically unsaturated double bonds in a molecule.

A compound having a fluorene ring and an ethylenically unsaturated double bond is preferably represented by Formula (VI).

[Chem. 9]

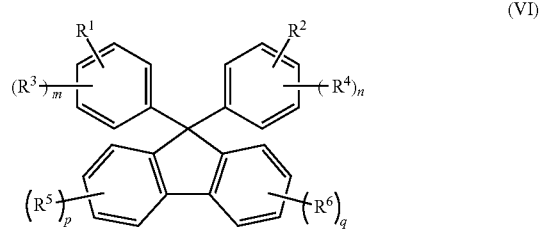

(In Formula (VI), each of $R^1$, $R^2$, $R^3$, $R^4$, $R^5$ and $R^6$ independently represents a mono-valent substituent, each of m, n, p and q independently represents an integer of 0 to 4, and at least one of $R^1$ and $R^2$ represents a mono-valent organic group having an ethylenically unsaturated double bond)

A preferred embodiment of above-mentioned Formula (VI) as a compound having a fluorene skeleton and an ethylenically unsaturated double bond in a molecule is represented by following Formula (VII).

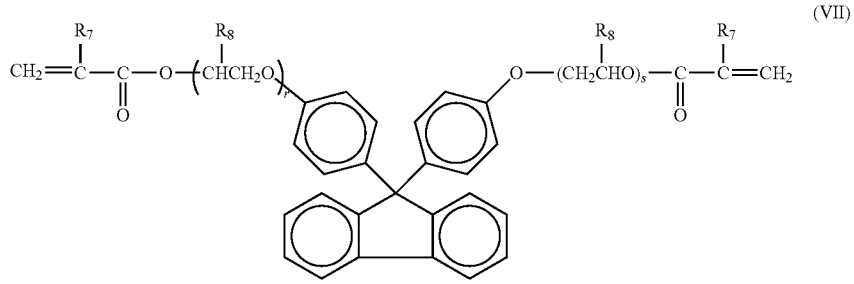

(In this formula, $R_7$ and $R_8$ represent hydrocarbon or a methyl group and r and s represent an integer of 0 to 5)

(A) When the total solid content of the curable composition for use in forming the low moisture-permeable layer is 100% by mass, any of a compound having a cycloaliphatic hydrocarbon group and an ethylenically unsaturated double bond and a compound having a fluorene ring and an ethylenically unsaturated double bond is contained in an amount of 50 to 99% by mass, based on the total solid content, and in terms of remarkably reducing the moisture permeability by the synergistic effect of (A) and (B) described above, is preferably contained in an amount of 50 to 99% by mass, more preferably 55 to 95% by mass and still more preferably 60 to 90% by mass.

[Compound Having an Ethylenically Unsaturated Double Bond Free of a Cycloaliphatic Hydrocarbon Group and a Fluorene Ring]

In a low moisture-permeable layer-forming composition used in the present invention, a compound having an ethylenically unsaturated double bond free of a cycloaliphatic hydrocarbon group and a fluorene ring in its molecule may be used together in a range that does adversely affect the present invention.

A compound having an ethylenically unsaturated double bond free of a cycloaliphatic hydrocarbon group and a fluorene ring is preferably a (meth)acrylate compound free of a cycloaliphatic hydrocarbon group and a fluorene ring.

Examples of this compound may include (meth)acrylic acid diesters of alkylene glycols, (meth)acrylic acid diesters of polyoxyalkylene glycols, (meth)acrylic acid diesters of polyhydric alcohols, (meth)acrylic acid diesters of ethylene oxide or propylene oxide adduct, epoxy(meth)acrylates, urethane(meth)acrylates, polyester(meth)acrylates and the like.

Among others, esters of polyhydric alcohol and (meth) acrylic acid are preferred. For example, 1,4-butanediol di(meth)acrylate, 1,6-hexanediol di(meth)acrylate, neopentyl glycol(meth)acrylate, ethylene glycol di(meth)acrylate, triethylene glycol di(meth)acrylate, pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth) acrylate, EO-modified triphosphate(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, polyurethane polyacrylate, polyester polyacrylate, caprolactone-modified tris(acryloxyethyl)isocyanurate, and the like.

As multifunctional acrylate-based compounds having a (meth)acryloyl group, commercially available ones, such as NK Ester A-TMMT manufactured by Shin-Nakamura Chemical Co., Ltd. and KAYARAD DPHA manufactured by Nippon Kayaku Co., Ltd., may be used. As poly-functional monomers, those described in Japanese Patent Application Laid-Open No. 2009-98658, paragraphs [0114] to [0122] may also be used in the present invention.

A compound having an ethylenically unsaturated double bond free of a cycloaliphatic hydrocarbon group may preferably be a compound having a hydrogen-bondable substituent in terms of the adhesion to a support, the low curling, and the immobilization of a fluorine-containing or silicon-based compound described below. The hydrogen-bondable substituent refers to a substituent in which atoms, such as nitrogen, oxygen, sulfur and halogen are bonded to hydrogen by covalent bonding. Specific examples thereof include —OH, —SH, —NH—, —CHO, —CONH—, —OCONH—, etc., and urethane(meth)acrylates or (meth) acrylates having a hydroxyl group are preferred. Polyfunctional acrylate having a commercially available (meth)acryloyl group may be used, and examples thereof include NK Oligo U4HA and NK Ester A-TMM-3 manufactured by Shin-Nakamura Chemical Co., Ltd., and KAYARAD PET-30 manufactured by Nippon Kayaku Co., Ltd.

When a compound having an ethylenically unsaturated double bond free of a cycloaliphatic hydrocarbon and a fluorene ring is contained, its content is preferably from 1 to 30% by mass, more preferably from 2 to 20% by mass, and still more preferably from 3 to 15% by mass, based on the total solid content when the total solid content of a low moisture-permeable layer-forming curable composition is set to 100% by mass.

[(B) Rosin Compound]

A rosin compound (B) in a low moisture-permeable layer-forming curable composition is at least one selected from rosin, HS (also referred to as a hydrogenated rosin), and an acid-modified rosin and an esterified rosin (also referred to as rosin ester).

A rosin may be an unmodified rosin, such as a tall oil rosin having a resin acid as the main component, including an abietic acid, a levopimaric acid, a palustric acid, a neoabietic acid, a dehydroabietic acid and a dihydroabietic acid, a gum rosin and a wood rosin.

A hydrogenated rosin refers to a hydrogenated one among the above-listed types of rosin, such as those with a high content of tetrahedron body (for example, 50% by mass or greater), such as tetrahydroabietic acid. Examples of acid-modified rosin include unsaturated acid-modified rosin obtained by adding an unsaturated acid, such as a maleic acid, a fumaric acid or an acrylic acid, by the Diels-Alder reaction. More specific examples thereof include a maleopimaric acid obtained by adding a maleic acid to rosin, a fumaropimaric acid obtained by adding a fumaric acid to rosin, an acrylopimaric acid obtained by adding an acrylic acid to rosin, and the like. Esterified rosin includes alkyl esters of rosin, glycerol ester obtained by esterification of rosin and glycerin, pentaerythritol esters obtained by esterification of rosin and pentaerythritol and the like.

Examples of the rosin ester above include Super Ester E-720, Super Ester E-730-55, Super Ester E-650, Super Ester E-786-60, Tamanol E-100, Emulsion AM-1002, Emulsion SE-50 (all trade names of special rosin ester emulsions manufactured by Arakawa Chemical Industries, Ltd.), Super Ester L, Super Ester A-18, Super Ester A-75, Super Ester A-100, Super Ester A-115, Super Ester A-125, Super Ester T-125 (all trade names of special rosin esters manufactured by Arakawa Chemical Industries, Ltd.) and the like.

In addition, examples of rosin ester include Ester gum AAG, Ester gum AAL, Ester gum A, Ester gum AAV, Ester gum 105, Ester gum HS, Ester gum AT, Ester gum H, Ester gum HP, Ester gum HD, Pensel A, Pensel AD, Pensel AZ, Pensel C, Pensel D-125, Pensel D-135, Pensel D-160 and Pensel KK (all trade names of rosin ester resins manufactured by Arakawa Chemical Industries, Ltd).

Examples of another type of rosin include RONDIS R, RONDIS K-25, RONDIS K-80, RONDIS K-18 (all trade names of rosin derivatives manufactured by Arakawa Chemical Industries, Ltd.), PINECRYSTAL KR-85, PINECRYSTAL KR-120, PINECRYSTAL KR-612, PINECRYSTAL KR-614, PINECRYSTAL KE-100, PINECRYSTAL KE-311, PINECRYSTAL KE-359, PINECRYSTAL KE-604, PINECRYSTAL 30PX, PINECRYSTAL D-6011, PINECRYSTAL D-6154, PINECRYSTAL D-6240, PINECRYSTAL KM-1500, and PINECRYSTAL KM-1550 (all trade names of super-light-colored rosin derivatives manufactured by Arakawa Chemical Industries, Ltd.), Aradime R-140, Aradime R-95 (all trade names of polymerized rosins manufactured by Arakawa Chemical Industries, Ltd.), Hypale CH (trade name of hydrogenated rosin manufactured by Arakawa Chemical Industries, Ltd.), Beamset 101 (trade name of rosin acrylate manufactured by Arakawa Chemical Industries, Ltd.) and the like.

The acid number of a rosin compound is preferably from 150 to 400 mgKOH/g, more preferably from 200 to 400 mgKOH/g and particularly preferably from 280 to 400 mgKOH/g. When a base film is a cellulose acrylate film, it is possible to obtain a very sound adhesion effect and simultaneously maintain the effect of moisture permeability reduction in a cured layer by limiting the acid number of the rosin compound to the above range.

Examples of a rosin compound having an acid number falling within the above range include the acid-modified rosin mentioned above. In particular, a rosin compound in which a maleic acid or a fumaric acid is added by the Diels-Alder reaction may preferably be used in the present invention.

Further, as a rosin compound, the present invention preferably uses rosin hydrogenated after acid modification. As a result of being hydrogenated, a residue double bond in the rosin compound is oxidized in a low moisture-permeable layer, thereby preventing the coloring of the film.

The softening point of a rosin compound is preferably from 70 to 170° C. When the softening point of the rosin compound is 70° C. or higher, the cured layer has an excellent blocking property without being softened. If the softening point is less than 170° C., it is possible to maintain solubility in a solvent, thereby making the haze of the cured layer difficult to rise.

The softening point of a rosin compound in the present invention can be measured by a ring and ball softening method described in JIS K-2531.

(B) When the total solid content of a low moisture-permeable layer-forming curable composition is 100% by mass, the content of a rosin compound is from 1 to 50% by mass based on the total solid content and is preferably from 10 to 40% by mass and more preferably from 20 to 30% by mass in terms of the remarkable reduction of moisture permeability by the synergistic effect of (A) and (B).

[Inorganic Layered Compound]

To further reduce the moisture permeability of a low moisture-permeable layer in the present invention, it is also preferable to disperse an inorganic layer compound in a binder which can be used in the above-described low moisture-permeable layer. Since an inorganic layer compound has a hydrophilic surface, it is preferably organically modified.

An inorganic layered compound is an inorganic compound having a structure in which unit crystal layers are laminated and exhibiting the property of swelling or cleaving by coordinating or absorbing a solvent between layers. Examples of such an inorganic compound include swelling hydrous silicate, such as smectite group clay minerals (montmorillonite, saponite and hectorite, etc.), palm curite group clay minerals, kaolinite group clay minerals and phyllosilicates (mica and the like). Furthermore, a synthetic inorganic layered compound is also preferably used. Examples of a synthetic inorganic layered compound include synthetic smectite (hectorite, saponite, stevensite, etc.), synthetic mica and the like. Smectite, montmorillonite and mica are preferred. An inorganic layered compound that may be used is commercially available under the trade names of MEB-3 (a synthetic mica aqueous dispersion manufactured by Co-op Chemical Co.), ME-100 (synthetic mica manufactured by Co-op Chemical Co., Ltd.), S1ME (synthetic mica manufactured by Co-op Chemical Co., Ltd.), SWN (synthetic smectite manufactured by Co-op Chemical Co., Ltd.), SWF (synthetic smectite manufactured by Co-op Chemical Co., Ltd.), Kunipia F (purified bentonite manufactured by Kunimine Industries Co., Ltd.), Ben-gel (purified bentonite manufactured by HOJUN Co., Ltd.), Ben-gel HV (purified bentonite manufactured by HOJUN Co., Ltd.), Ben-gel FW (purified bentonite manufactured by HOJUN Co., Ltd.), Ben-gel Bright 11 (purified bentonite manufactured by HOJUN Co., Ltd.), Ben-gel Bright 23 (purified bentonite manufactured by HOJUN Co., Ltd.), Ben-gel Bright 25 (purified bentonite manufactured by HOJUN Co., Ltd.), Ben-gel A (purified bentonite manufactured by HOJUN Co., Ltd.), Ben-gel 2M (purified bentonite manufactured by HOJUN Co., Ltd.), and the like.

Also, such an inorganic layered compound is preferably provided by organically modifying the above-described inorganic layered compound.

Examples of an organically modified inorganic layered compound include an organically modified inorganic layered compound described in paragraphs [0038] to [0044] of Japanese Patent Application Laid-Open No. 2012-234094 and the like.

A swelling layered inorganic compound is preferably atomized in terms of allowing the low moisture permeability and the adhesion between a base film and a low moisture-permeable layer to coexist. An atomized swelling layered inorganic compound is generally plate-like or flat, and a planar shape is not particularly limited and may be amorphous or like. The average particle size of an atomized swelling layered inorganic compound (the average particle size of a planar shape) may be, for example, preferably from 0.1 to 10 µm, more preferably from 0.1 to 8 µm, and particularly preferably from 0.1 to 6 µm.

[Polymerization Initiator]

A composition containing a compound having a cycloaliphatic hydrocarbon and an ethylenically unsaturated double bond in a molecule and/or a compound having a fluorene skeleton and an ethylenically unsaturated double bond in a molecule preferably contains a polymerization initiator. As the polymerization initiator, a photopolymerization initiator is preferred.

Examples of the photopolymerization initiator include acetophenones, benzoins, benzophenones, phosphine oxides, ketals, anthraquinones, thioxanthones, azo compounds, peroxides, 2,3-dialkyl-dione compounds, disulfide compounds, fluoro amine compounds, aromatic sulfonium, lophine dimers, onium salts, borate salts, active esters, active halogens, inorganic complexes and coumarins. Specific examples, preferred embodiments and commercially available products of a photopolymerization initiator are described in Japanese Patent Application Laid-Open No. 2009-098658, paragraphs [0133] to [0151] and may also be suitably used in the present invention.

Different examples are also described in Kiyomi Kato, "Latest UV Curing Technology" {Technical Information Institute Co., Ltd.} (1991), p. 159, and "UV Curing System," (Kabushikikaisha Sogo Gijutsu Center, 1989), pp. 65-148 and are useful for the present invention.

Preferred examples of a photocleavage type photoradical polymerization initiator that is commercially available include "Irgacure 651," "Irgacure 184," "Irgacure 819," "Irgacure 907," "Irgacure 1870" (CGI-403/Irgacure 184=a 7/3 mixed initiator), "Irgacure 500," "Irgacure 369," "Irgacure 1173," "Irgacure 2959," "Irgacure 4265," "Irgacure 4263," "Irgacure 127," "OXE01" and the like, manufactured by BASF; "Kayacure DETX-S," "Kayacure BP-100," "Kayacure BDMK," "Kayacure CTX," "Kayacure BMS," "Kayacure 2-EAQ," "Kayacure ABQ," "Kayacure CPTX," "Kayacure EPD," "Kayacure ITX," "Kayacure QTX," "Kayacure BTC," "Kayacure MCA" and the like, manufactured by Nippon Kayaku Co.; "Esacure (KIP100F, KB1, EB3, BP, X33, KTO46, KT37, KIP150, TZT)" and the like, manufactured by Sartomer Company, Inc."; and combinations thereof.

The content of a photopolymerization initiator in a composition containing a compound having a cycloaliphatic hydrocarbon group and an ethylenically unsaturated double bond in a molecule and/or a compound having a fluorene skeleton and an ethylenically unsaturated double bond in a molecule, as used in the present invention, is preferably from 0.5 to 8% by mass and more preferably from 1 to 5% by mass based on the total solid content of the composition, in terms of determining the content such that a polymerizable compound contained in the composition is polymerized while the starting point is prevented from overly increasing.

[UV Absorber]

The optical film of the present invention, which includes a low moisture-permeable layer, is used in a polarizing plate or a member of a liquid crystal display device. In terms of preventing the polarizing plate or liquid crystal from deteriorating, the optical film may be given a UV absorbing property by the containment of a UV absorber in the low moisture-permeable layer.

As a UV absorber, well-known UV absorbers may be used, such as those described in Japanese Patent Application Laid-Open No. 2001-72782 or Japanese PCT Patent Application Laid-Open No. 2002-543265. Specific and preferred examples of a UV absorber include the same specific and preferred examples as described below in the Section entitled {Base film}, Subsection entitled <UV Absorber>.

[Solvent]

A low moisture-permeable layer-forming curable composition may contain a solvent. As a solvent, different types of solvent may be used in consideration of the solubility of monomer, the drying property of coating, the dispersibility of light-transmitting particle. As such an organic solvent, for example, dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methyl cyclohexanone, ethyl formate, propyl formate pentyl, methyl acetate, ethyl acetate, propyl acetate, methyl propionate, ethyl propionate, γ-butyrolactone, 2-methoxy-methyl acetate, 2-ethoxy-methyl acetate, 2-ethoxyethyl acetate, 2-ethyl ethoxypropionate, 2-methoxy ethanol, 2-propoxy ethanol, 2-butoxy ethanol, 1,2-diacetoxy acetone, acetylacetone, diacetone alcohol, methyl acetoacetate, methyl alcohol such as ethyl acetoacetate, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethyl cyclohexane, benzene, toluene and xylene can be used alone or in combination of two or more thereof.

Of the above-listed solvents, it is preferred to use at least one of dimethyl carbonate, methyl acetate, ethyl acetate, methyl ethyl ketone, acetylacetone and acetone, it is more preferred to use any of dimethyl carbonate and methyl acetate, and it is particularly preferred to use methyl acetate.

It is preferred to use a solvent in such an amount that the solid content of a low moisture-permeable layer-forming curable composition ranges preferably from 20 to 80% by mass, more preferably from 30 to 75% by mass and more preferably from 40 to 70% by mass.

(Configuration of Low Moisture-Permeable Layer and Method of Manufacturing the Same)

The low moisture-permeable layer of the present invention may be a single layer or may be provided in the form of a plurality of layers. Although laminating the low moisture permeable layer is not particularly limited, it is preferred to manufacture the low moisture-permeable layer by co-tape casting with a base film, or form the low moisture-permeable layer on the base film by coating, and it is more preferred to form the low moisture-permeable layer on the base film by coating.

(Film Thickness of Low Moisture-Permeable Layer)

The film thickness of the low moisture-permeable layer of the present invention is preferably from 0.5 to 25 µm more preferably 1 to 20 µm, still more preferably from 2 to 18 µm and particularly preferably 3 to 17 µm.

(Moisture Permeability of Low Moisture-Permeable Layer)

From a gas-permeation formula of a composite film [e.g., Tsutomu Nakawa, "Science of Barrier Property of Packaging Material" (SPSTJ Basic Course 5), pp. 68-72, The Society of Packaging Science & Technology, Japan], the moisture permeability of a polarizing plate protective film in a normal state is denoted as $J_f$, the moisture permeability of a base film is denoted as $J_s$, and the moisture permeability of a low moisture-permeable layer when an optical film is separated into a base film and a low moisture-permeable layer is denoted as $J_b$. As a result, the following equation is established:

$$1/J_f = 1/J_s + 1/J_b \qquad \text{Equation (1)}$$

The moisture permeability of the optical film $J_f$ and the moisture permeability of the base film $J_s$ can be directly measured and, based on the measurement thereof, the moisture permeability of the low moisture-permeable layer $J_b$ can be calculated.

In the present invention, it is preferred that the moisture permeability of a low moisture-permeable layer is from 5.0 to 100 g/m²/day.

(Moisture Permeability Per Unit Film Thickness of Low Moisture-Permeable Layer)

Moisture permeability under a normal condition is generally known to be inversely proportional to the film thickness. Accordingly, the moisture permeability that can be reached by a low moisture-permeable layer within the above-described film thickness range depends on the moisture permeability per unit film thickness, which is a characteristic value of material, and as the value is smaller, a lower moisture permeability can be achieved. Further, the moisture permeability can be adjusted by adjusting the film thickness of a low moisture-permeable layer based on the relationship above. However, if the moisture permeability per unit film thickness is overly low, the moisture permeability of an optical film is hardly controlled.

In consideration of these two factors, the moisture permeability of a low moisture-permeable layer per film thickness of 10 µm is preferably from 5.0 to 150 g/m²/day, more preferably from 10 to 100 g/m²/day, still more preferably from 20 to 90 g/m²/day and particularly preferably from 30 to 80 g/m²/day.

(The moisture permeability is a value reached after the lapse of 24 hours at 40° C. and a relative humidity of 90% according to JIS Z-0208).

In addition, the moisture permeability of a low moisture-permeable layer per film thickness of 10 µm is estimated from the moisture permeability of a base film and an optical film and the film thickness of a low moisture-permeable layer, as follows.

The moisture permeability relative to the 10 µm film thickness of low moisture-permeable layer $C_b(10\,\mu m)$ can be represented by the following equation based on the value of $J_b$ calculated above:

$$C_b(10\,\mu m) = J_b \times d_b/10 [g/m^2/day] \qquad \text{Equation (2)}$$

(wherein $d_b[\mu m]$ is the film thickness of the low moisture-permeable layer and as described above, can be calculated based on a difference in film thickness between before and after the stacking of the low moisture-permeable layer).

It is also preferred that the low moisture-permeable layer of the optical film of the present invention is preferably configured to have a moisture permeability hard coat layer function, an antireflection function, an antifouling function, etc.

{Base Film}

[Material for Base Film]

As a material for forming a base film, a polymer, which is excellent in optical performance transparency, mechanical strength, thermal stability, isotropic property, etc., is preferred. Transparency as used in the present invention indicates that the transmittance of visible light is 60% or more, preferably 80% or more and particularly preferably 90% or more. Examples of the polymer include a polycarbonate-based polymer, a polyester-based polymer such as polyethylene terephthalate or polyethylene naphthalate, a (meth)acrylic polymer such as polymethyl methacrylate, and a styrene-based polymer such as polystyrene and an acrylonitrile-styrene copolymer (an AS resin). Other examples include polyolefin such as polyethylene and polypropylene, a polyolefin-based polymer such as an ethylene-propylene copolymer, a vinyl chloride-based polymer, an amide-based polymer such as nylon and aromatic polyamide, an imide-based polymer, a sulfone-based polymer, a polyethersulfone-based polymer, a polyether ether ketone-based polymer, a polyphenylene sulfide-based polymer, a vinylidene chloride-based polymer, a vinyl butyral-based polymer, an allylate-based polymer, a polyoxymethylene-based polymer, an epoxy-based polymer, or a polymer obtained by mixing the polymers above. In addition, the polymer film of the present invention may also be formed as a cured layer of an ultraviolet-curable or thermosetting resin, such as acrylic, urethane-based, acrylic urethane-based, epoxy-based or silicone-based resin.

Also, as a material for forming a base film, a cellulose-based polymer (particularly preferably cellulose acylate) represented by triacetyl cellulose, which has been employed as a transparent protective film for a conventional polarizing plate, may also be preferably used. Furthermore, this material may also be preferably used in an acrylic film, introduction of which has recently been proposed for use as a polarizing plate protecting film. In the following, as an example of the base film of the present invention, cellulose acylate and a (meth)acrylic polymer will be described in detail, but their technical details may be similarly applied to other polymer films.

[Substitution Degree of Cellulose Acylate]

Next, the cellulose acylate of the present invention produced using the above-described cellulose as a raw material will be described below. The cellulose acylate is obtained by acylating the hydroxyl group of cellulose, and as the substituent therefor, any of acetyl groups in an acyl group, beginning from an acetyl group having 2 carbon atoms to an acetyl group having 22 carbon atoms, may be used. In the cellulose acylate of the present invention, the substitution degree of an acyl group for the hydroxyl group of cellulose is not particularly limited, but the substitution degree may be calculated by measuring the bonding degree of an acetic acid and/or a carboxylic acid having 3 to 22 carbon atoms for acylating the hydroxyl group of cellulose. A measurement method may be performed in accordance with D-817-91 of ASTM.

The substitution degree of the acyl group for the hydroxyl group of cellulose is not particularly limited but is preferably from 2.50 to 3.00, more preferably from 2.75 to 3.00 and still more preferably from 2.85 to 3.00.

An acetic acid and/or a carboxylic acid having 3 to 22 carbon atoms for acylating the hydroxyl group of cellulose may be an aliphatic carboxylic acid or an aromatic carboxylic acid and may be either a single kind or a mixture of two or more kinds. Cellulose esters acylated thereby include, for example, an alkylcarbonyl ester of cellulose, an alkenylcarbonyl ester or aromatic carbonyl ester of cellulose, and an aromatic alkyl carbonyl ester of cellulose, each of which may further have a substituted group. Examples of a preferred acyl group include an acetyl group, a propionyl group, an n-butanoyl group, a heptanoyl group, a hexanoyl group, an octanoyl group, a decanoyl group, a dodecanoyl group, a tridecanoyl group, a tetradecanoyl group, a hexadecanoyl group, an octadecanoyl group, an iso-butanoyl group, a cyclohexanecarbonyl group, an oleoyl group, a benzoyl group, a naphthylcarbonyl group, a cinnamoyl group, etc. Among others, an acetyl group, a propionyl group, a butanoyl group, a dodecanoyl group, an octadecanoyl group, a t-butanoyl group, an oleoyl group, a benzoyl group, a naphthylcarbonyl group, a cinnamoyl group, etc. are preferred, and an acetyl group, a propionyl group and an n-butanoyl group are more preferred.

<Cellulose Acylate-Based Base film>

[Polymerization Degree of Cellulose Acylate]

The polymerization degree of the cellulose acylate that is preferably used in the present invention ranges from 180 to 700 in terms of viscosity average polymerization degree and in cellulose acetate, ranges more preferably from 180 to 550, still more preferably from 180 to 400 and particularly preferably from 180 to 350.

The base film is also preferably a (meth)acrylic polymer and more preferably a (meth)acrylic polymer having, in its main chain, at least any one of a lactone ring structure, an anhydrous glutaric acid ring structure and a glutarimide ring structure.

Meanwhile, the general idea of a (meth)acrylic polymer includes both of a methacrylic polymer and an acrylic polymer. Further, the (meth)acrylic polymer also includes an acrylate/methacrylate derivative and particularly an acrylateester/methacrylate ester (co)polymer.

((Meth)acrylic Polymer)

The above-described (meth)acrylic polymer preferably contains, as a repeating structural unit, a repeating structural unit derived from a (meth)acrylic acid ester monomer.

The above-described (meth)acrylic polymer may further contain, as a repeating structural unit, a repeating structural unit constructed by polymerizing at least one selected from a hydroxyl group-containing monomer, an unsaturated carboxylic acid and a monomer represented by following formula (201)

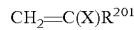            Formula (201):

(where $R^{201}$ represents a hydrogen atom or a methyl group, X represents a hydrogen atom, an alkyl group having 1 to 20 carbon atoms, an aryl group, a —CN group, a —CO—$R^{202}$ group or a —O—CO—$R^{203}$ group, and $R^{202}$ and $R^{203}$ represent a hydrogen atom or an organic residue having 1 to 20 carbon atoms).

The above-described (meth)acrylic acid ester is not particularly limited but includes: for example, an acrylic acid ester such as methyl acrylate, ethyl acrylate, n-butyl acrylate, isobutyl acrylate, tert-butyl acrylate, cyclohexyl acrylate and benzyl acrylate; and a methacrylic acid ester such as methyl methacrylate, ethyl methacrylate, propyl methacrylate, n-butyl methacrylate, isobutyl methacrylate, tert-butyl methacrylate, cyclohexyl methacrylate and benzyl methacrylate, and only one of these esters may be used or two or more thereof may be used in combination. Among others, methyl methacrylate is preferred because it is excellent in heat resistance and transparency.

In case of using the above-described (meth)acrylic acid ester, its content rate in monomer components used in a polymerization process is preferably from 10 to 100% by mass, more preferably from 10 to 100% by mass, still more preferably from 40 to 100% by mass, and particularly preferably from 50 to 100% by mass in order to allow the present invention to fully exhibit its effect.

The above-described hydroxyl group-containing monomer includes a 2-(hydroxyalkyl)acrylic acid ester such as α-hydroxymethylstyrene, α-hydroxyethylstyrene and methyl 2-(hydroxyethyl)acrylate; and a 2-(hydroxyalkyl) acrylic acid such as 2-(hydroxyethyl)acrylic acid, and only one of these monomers may be used or two or more thereof may be used in combination.

In case of using the above-described hydroxyl group-containing monomer, its content rate in monomer components used in a polymerization process is preferably from 0 to 30% by mass, more preferably from 0 to 20% by mass, still more preferably from 0 to 15% by mass, and particularly preferably from 0 to 10% by mass in order to fully exhibit the effects of the present invention.

The above-described unsaturated carboxylic acid includes, for example, an acrylic acid, a methacrylic acid, a crotonic acid, an α-substituted acrylic acid, and an α-substituted methacrylic acid, and only one of these acids may be used or two or more thereof may be used in combination. Among others, an acrylic acid and a methacrylic acid are preferred in terms of allowing the present invention to fully exhibit its effects.

In case of using the above-described unsaturated carboxylic acid, its content rate in monomer components used in a polymerization step is preferably from 0 to 30% by mass, more preferably from 0 to 20% by mass, still more preferably from 0 to 15% by mass and particularly preferably from 0 to 10% by mass in order to fully exhibit the effects of the present invention.

A monomer represented by Formula (201) includes, for example, styrene, vinyltoluene, α-methylstyrene, acrylonitrile, methyl vinyl ketone, ethylene, propylene and vinyl acetate, and only one of these monomers may be used or two or more thereof may be used in combination. Among others, styrene and α-methylstyrene are preferred in terms of allowing the present invention to fully exhibit its effects.

In case of using the above-described monomer represented by Formula (201), its content rate in monomer components used in a polymerization step is preferably from 0 to 30% by mass, more preferably from 0 to 20% by mass, still more preferably from 0 to 15% by mass and particularly preferably from 0 to 10% by mass, in terms of fully exhibiting the effects of the present invention.

[(Meth)Acrylic Polymer Having Ring Structure in Main Chain]

Among (meth)acrylic polymers, a polymer having a ring structure in its main chain is preferred. By introducing a ring structure into the main chain, the rigidity of the main chain can be increased to thereby improve heat resistance.

Among (meth)acrylic polymers having a ring structure in their main chain, any of a polymer having a lactone ring structure in the main chain, a polymer having an anhydrous glutaric acid ring structure in the main chain and a polymer having a glutarimide ring structure in the main chain is preferred in the present invention. Above all, a polymer having a lactone ring structure in the main chain is more preferred.

These polymers having a ring structure in the main chain will be described in sequence.

((Meth)Acrylic Polymer Having Lactone Ring Structure in Main Chain)

A (meth)acrylic polymer having a lactone ring structure in its main chain (hereinafter, sometimes referred to as a lactone ring-containing polymer) is not particularly limited as long as it is a (meth)acrylic polymer having a lactone ring in the main chain, but the polymer preferably has a lactone ring structure represented by following Formula (401).

Formula (401):

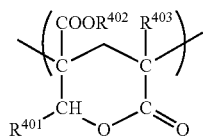

[Chem. 11]

In Formula (401), each of $R^{401}$, $R^{402}$ and $R^{403}$ independently represents a hydrogen atom or an organic residue having 1 to 20 carbon atoms, and the organic residue may contain an oxygen atom. Here, the organic residue having 1 to 20 carbon atoms is preferably a methyl group, an ethyl group, an isopropyl group, an n-butyl group, a tert-butyl group, etc.

The content rate of the above-described lactone ring structure represented by Formula (401) in a lactone ring-containing polymer structure is preferably from 5 to 90% by mass, more preferably from 10 to 70% by mass, still more preferably from 10 to 60% by mass and particularly preferably from 10 to 50% by mass. By limiting the content rate of a lactone ring structure to 5% by mass or more, the heat resistance and surface hardness of an obtained polymer tends to be enhanced, and by limiting the content rate of a lactone ring structure to 90% by mass or less, the molding processability of an obtained polymer tends to be improved.

A method of manufacturing a lactone ring-containing polymer is not particularly limited, but a lactone ring-containing polymer is preferably obtained by obtaining a polymer (p) having a hydroxyl group and an ester group in a molecular chain through a polymerization process and then performing a lactone ring-condensation process that thermally treats the obtained polymer (p) to introduce a lactone ring structure into the polymer.

The mass average molecular weight of the lactone ring-containing polymer is preferably from 1,000 to 2,000,000, more preferably from 5,000 to 1,000,000, still more preferably from 10,000 to 500,000 and particularly preferably from 50,000 to 500,000.

The lactone ring-containing polymer has a mass loss rate of preferably 1% or less, more preferably 0.5% or less and still more preferably 0.3% or less within a range of from 150 to 300° C. in dynamic TG measurement. As a method for dynamic TG measurement, the method described in Japanese Patent Application Laid-Open No. 2002-138106 may be used.

Since a lactone ring-containing polymer has a high ring condensation reaction rate, a dealcoholization reaction is less likely to occur in the production of a molded article, so that a defect attributable to the alcohol such as bubble or silver streak entering the molded article after the molding can be avoided. Furthermore, since a lactone ring structure is sufficiently introduced into the polymer due to a high ring condensation reaction rate, the obtained lactone ring-containing polymer has high heat resistance.

In a chloroform solution having a concentration of 15% by mass, the lactone ring-containing polymer has a coloring degree (YI) of preferably 6 or less, more preferably 3 or less, still more preferably 2 or less and particularly preferably 1 or less. When the polymer has a coloring degree (YI) of 6 or less, it hardly causes a problem such as damage to the transparency due to coloring and therefore can be preferably used in the present invention.

The 5% mass loss temperature of the lactone ring-containing polymer shown by thermogravimetry (TG) is preferably 330° C. or more, more preferably 350° C. or more and still more preferably 360° C. or more. The 5% mass loss temperature by thermogravimetry (TG) is indicative of thermal stability and by limiting the temperature to 330° C. or more, a sufficient thermal stability tends to be exhibited. For thermogravimetry, the above-described apparatus for dynamic TG measurement above may be used.

The glass transition temperature (Tg) of the lactone ring-containing polymer is preferably 115° C. or more, more preferably 125° C. or more, still more preferably 130° C. or more and particularly preferably 135° C. or more, and most preferably 140° C. or more.

The total residual volatile content in the lactone ring-containing polymer is preferably 5,000 ppm or less, more preferably 2,000 ppm or less, still more preferably 1,500 ppm or less and particularly preferably 1,000 ppm. The total residual volatile content having a range of 5,000 ppm or less is preferred because within this range, coloration due to alteration or the like at the time of molding or a molding failure such as bubbling or silver streak hardly occurs.

The total light transmittance of the lactone ring-containing polymer as measured by a method according to ASTM-D-1003 for a molded article obtained by injection molding is preferably 85% or more, more preferably 88% or more, and still more preferably 90% or more. The total light transmittance is indicative of transparency and when the total light transmittance is 85% or more, the transparency tends to be enhanced.

In a polymerization type using a solvent, the polymerization solvent is not particularly limited, but includes, for example, an aromatic hydrocarbon-based solvent such as toluene, xylene and ethylbenzene; a ketone-based solvent such as methyl ethyl ketone and methyl isobutyl ketone; and an ether-based solvent such as tetrahydrofuran, and only one of these solvents may be used or two or more thereof may be used in combination.

In a first embodiment of the manufacturing method in the present invention, the polymer is formed by dissolving a (meth)acrylic resin in a solvent and then performing solution casting. Therefore, the solvent in synthesizing a (meth)acrylic resin is less restricted than in film forming by melting. Optionally, a solvent with a high boiling point may be used in synthesis.

At the time of polymerization reaction, a polymerization initiator may be added, if necessary. A polymerization initiator is not particularly limited, but includes, for example, an organic peroxide such as cumene hydroperoxide, diisopropylbenzene hydroperoxide, di-tert-butyl peroxide, lauroyl peroxide, benzoyl peroxide, tert-butylperoxyisopropyl carbonate and tert-amylperoxy-2-ethylhexanoate; and an azo compound such as 2,2'-azobis(isobutyronitrile), 1,1'-azobis(cyclohexanecarbonitrile) and 2,2'-azobis(2,4-dimethylvaleronitrile), and only one of these compounds may be used or two or more thereof may be used in combination. The amount of a polymerization initiator used may be appropriately determined according to a combination of monomers used or reaction conditions, but is not particularly limited.

The weight average molecular weight of a polymerizer can be adjusted by adjusting the amount of a polymerization initiator.

When performing polymerization, the concentration of a polymer produced in a polymerization reaction mixture is controlled to be preferably 50% by mass or less so as to suppress gelling of a reaction solution. Specifically, when the concentration of a polymer produced in a polymerization reaction mixture exceeds 50% by mass, a polymerization solvent is appropriately added to a polymerization reaction mixture to control the concentration to be preferably 50% by mass or less. The concentration of a polymer produced in a polymerization reaction mixture is more preferably 45% by mass or less and still more preferably 40% by mass or less.

The manner of appropriately adding a polymerization solvent to a polymerization reaction mixture is not particularly limited, and the polymerization solvent may be added continuously or intermittently. By controlling the concentration of a polymer produced in a polymerization reaction mixture in this way, the gelling of a reaction solution can be more sufficiently suppressed. A polymerization solvent added may be the same kind of solvent as that used at the time of initial preparation for the polymerization reaction or may be a different kind of solvent, but it is preferred to use the same kind of solvent as that used at the time of initial preparation for the polymerization reaction. Also, a polymerization solvent added may be only one solvent or a mixture of two or more solvents.

(Polymer Having Glutaric Anhydride Ring Structure in Main Chain)

A polymer having a glutaric anhydride ring structure in its main chain refers to a polymer having a glutaric anhydride unit.

It is preferred that a polymer having a glutaric anhydride unit has a glutaric anhydride unit represented by following Formula (101) (hereinafter, referred to as a glutaric anhydride unit).

Formula (101):

[Chem. 12]

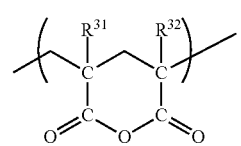

In Formula (101), each of $R^{31}$ and $R^{32}$ independently represents a hydrogen atom or an organic residue having 1 to 20 carbon atoms. Among others, each of $R^{31}$ and $R^{32}$ particularly preferably represents a hydrogen atom or an alkyl group having 1 to 5 carbon atoms, which is same as or different from each other.

A polymer having a glutaric anhydride unit is preferably a (meth)acrylic polymer containing a glutaric anhydride unit. In terms of heat resistance, a (meth)acrylic polymer preferably has a glass transition temperature (Tg) of 120° C. or more.

The content rate of a glutaric anhydride unit relative to a (meth)acrylic polymer is preferably from 5 to 50% by mass and more preferably from 10 to 45% by mass. By limiting the content rate to 5% by mass or more and more preferably 10% by mass or more, an effect of enhancing the heat resistance can be obtained and further, an effect of enhancing the weather resistance can also be obtained.

The above-described (meth)acrylic copolymer preferably further contains a repeating unit based on an unsaturated carboxylic alkyl ester. The repeating unit based on the unsaturated carboxylic alkyl ester is preferably represented, for example, by following Formula (102).

—[CH$_2$—C(R$^{41}$)COOR$^{42}$]—      Formula (102):

In Formula (102), R$^{41}$ represents hydrogen or an alkyl group having 1 to 5 carbon atoms, and R$^{42}$ represents an aliphatic or alicyclic hydrocarbon group having 1 to 6 carbon atoms, or an aliphatic or alicyclic hydrocarbon group having 1 to 6 carbon atoms substituted with the number of hydroxyl groups or halogens below one or more carbon atoms.

A monomer corresponding to the repeating unit represented by Formula (102) is represented by following Formula (103).

CH$_2$=C(R$^{41}$)COOR$^{42}$      Formula (103):

Preferred specific examples of the monomer include methyl(meth)acrylate, ethyl(meth)acrylate, n-propyl(meth)acrylate, n-butyl(meth)acrylate, tert-butyl(meth)acrylate, n-hexyl(meth)acrylate, cyclohexyl(meth)acrylate, chloromethyl(meth)acrylate, 2-chloroethyl(meth)acrylate, 2-hydroxyethyl(meth)acrylate, 3-hydroxypropyl(meth)acrylate, 2,3,4,5,6-pentahydroxyhexyl(meth)acrylate, and 2,3,4,5-tetrahydroxypentyl(meth)acrylate, and among others, methyl methacrylate is most preferably used. One of these monomers may be used alone or two or more thereof may be used in combination.

The content rate of an unsaturated carboxylic acid alkyl ester unit relative to the above-described (meth)acrylic polymer is preferably from 50 to 95% by mass and more preferably from 55 to 90% by mass. A (meth)acrylic polymer having a glutaric anhydride unit and an unsaturated carboxylic acid alkyl ester-based unit may be obtained, for example, by performing polymerization and cyclization of a copolymer having an unsaturated carboxylic acid alkyl ester-based unit and an unsaturated carboxylic acid unit.

A unsaturated carboxylic acid unit is preferably represented, for example, by following Formula (104).

—[CH$_2$—C(R$^{51}$)COOH]—      Formula (104):

where R$^{51}$ represents hydrogen or an alkyl group having 1 to 5 carbon atoms.

Preferred specific examples of a monomer deriving an unsaturated carboxylic acid unit include a compound represented by following Formula (105), which is a monomer corresponding to the repeating unit represented by Formula (104), a maleic acid and further a hydrolysate of maleic anhydride. In terms of exhibiting excellent thermal stability, acrylic acid and methacrylic acid are preferred and methacrylic acid is more preferred.

CH$_2$=C(R$^{51}$)COOH      Formula (105):

One of these monomers may be used alone or two or more thereof may be used in combination. As described above, an acrylic thermoplastic copolymer having a glutaric anhydride unit and an unsaturated carboxylic acid alkyl ester-based unit can be obtained, for example, by performing polymerization and cyclization of a copolymer having an unsaturated carboxylic acid alkyl ester-based unit and an unsaturated carboxylic acid unit and therefore, an unsaturated carboxylic acid unit may remain in its constitutional units.

The content of an unsaturated carboxylic acid unit relative to the above-described (meth)acrylic polymer is preferably 10% by mass or less and more preferably 5% by mass or less. By limiting the content to 10% by mass or less, a reduction in colorless transparency and residence stability can be prevented.

In addition, the above-described (meth)acrylic polymer may have other aromatic ring-free vinyl-based monomer units as long as the effect of the present invention is not impaired. Specific examples of other aromatic ring-free vinyl-based monomer units include, in terms of corresponding monomer, a vinyl cyanide-based monomer such as acrylonitrile, methacrylonitrile and ethacrylonitrile; allyl glycidyl ether; maleic anhydride and itaconic anhydride; N-methylmaleimide, N-ethylmaleimide, N-cyclohexylmaleimide, acrylamide, methacrylamide, N-methylacrylamide, butoxymethylacrylamide and N-propylmethacrylamide; aminoethyl acrylate, propylaminoethyl acrylate, dimethylaminoethyl methacrylate, ethylaminopropyl methacrylate and cyclohexylaminoethyl methacrylate; N-vinyldiethylamine, N-acetylvinylamine, allylamine, methallylamine and N-methylallylamine; and 2-isopropenyl-oxazoline, 2-vinyloxazoline and 2-acroyl-oxazoline. One of these monomer units may be used alone or two or more thereof may be used in combination.

The content of other aromatic ring-free vinyl-based monomer units relative to the above-described (meth)acrylic polymer is preferably 35% by mass or less.

Further, an aromatic ring-containing vinyl-based monomer unit (e.g., N-phenylmaleimide, phenylaminoethyl methacrylate, p-glycidylstyrene, p-aminostyrene, 2-styryl-oxazoline) tends to reduce the scratch resistance and the weather resistance and therefore, the content thereof relative to the above-described (meth)acrylic polymer is preferably kept at 1% by mass or less.

((Meth)Acrylic Polymer Having Glutarimide Ring Structure in Main Chain)

A (meth)acrylic polymer having a glutarimide ring structure in its main chain (hereinafter, sometimes referred to as a glutarimide-based resin) is able to express a preferred characteristic balance in optical property or heat resistance as a result of having a glutarimide ring structure in its main chain. The (meth)acrylic polymer having a glutarimide ring structure in the main chain preferably contains a glutarimide resin having 20% by mass or more of a glutarimide unit represented by Formula (301):

Formula (301)

[Chem. 13]

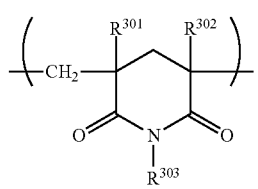

(In the formula, each of R$^{301}$, R$^{302}$ and R$^{303}$ independently represents hydrogen, an unsubstituted or substituted alkyl group having 1 to 12 carbon atoms, a cycloalkyl group and an aryl group).

A preferred glutarimide unit constituting a glutarimide-based resin for use in the present invention is a glutarimide unit where R$^{301}$ and R$^{302}$ are hydrogen or a methyl group and R$^{303}$ is a methyl group or a cyclohexyl group. The glutarimide unit may be a single kind of unit or may contain a plurality of kinds of unit having different $R^{301}$, $R^{302}$ and $R^{303}$.

A preferred second constitutional unit constituting a glutarimide-based resin for use in the present invention is a unit composed of an acrylic ester or a methacrylic ester. Preferred acrylic ester or methacrylic ester constitutional units include methyl acrylate, ethyl acrylate, methyl methacrylate, and ethyl methacrylate. Other preferred imidizable units include N-alkyl methacrylamide such as N-methyl methacrylamide and N-ethyl methacrylamide. This second constitutional unit may be a single kind of unit or may contain a plurality of kinds of unit.

The content of a glutarimide unit represented by Formula (301) in a glutarimide-based resin is preferably 20% by mass or more based on the entire repeating units in the glutarimide-based resin. The content of the glutarimide unit is preferably from 20 to 95% by mass, more preferably from 50 to 90% by mass and particularly preferably from 60 to 80% by mass. As a result of keeping the content of the glutarimide unit at 20% by mass or more, the obtained film is preferable in the performance of heat resistance and transparency. Also, as a result of keeping the content at 95% by mass or less, it is easy to form into a film and the obtained film can maintain the mechanical strength and also has excellent transparency.

In a glutarimide-based resin, a third constitutional unit may also be copolymerized, if necessary. As preferred examples of the third constitutional unit, a constitutional unit obtained by copolymerizing a styrene-based monomer such as styrene, substituted styrene and α-methylstyrene, an acrylic monomer such as butyl acrylate, a nitrile-based monomer such as acrylonitrile and methacrylonitrile, a maleimide-based monomer such as maleimide, N-methyl-maleimide, N-phenylmaleimide and N-cyclohexylmaleimide, and the like may be used. These monomers may be directly copolymerized with a glutarimide unit and an imidizable unit in a glutarimide-based resin or may be graft-copolymerized with a resin containing a glutarimide unit and an imidizable unit. When adding the third component, its content rate in the glutarimide-based resin is preferably from 5 to 30 mol % based on the entire repeating units in the glutarimide-based resin.

A glutarimide-based resin is described in U.S. Pat. Nos. 3,284,425 and 4,246,374, Japanese Patent Application Laid-Open No. H2-153904, etc. and can be obtained by using a resin mainly formed of a raw material such as a methacrylic acid methylester or the like as a resin having an imidizable unit and imidizing this resin having an imidizable unit by using ammonia or substituted amine There is a case where when obtaining a glutarimide-based resin, a unit composed of an acrylic acid, a methacrylic acid or an anhydride thereof is introduced as a reaction byproduct into the glutarimide-based resin. The presence of such a constitutional unit, particularly the presence of an acid anhydride, is not preferred because it reduces the total light transmittance or haze of the obtained film of the present invention. The content of the acrylic acid or the methacrylic acid is kept at 0.5 milliequivalent or less, preferably 0.3 milliequivalent or less and more preferably 0.1 milliequivalent or less, per 1 g of the resin. A glutarimide-based resin may also be obtained, as seen in Japanese Patent Application Laid-Open No. H2-153904, by imidizing a resin mainly composed of N-methylacrylamide and a methacrylic methylester.

Further, a glutarimide-based resin preferably has a weight average molecular weight of $1 \times 10^4$ to $5 \times 10^5$.

<UV Absorber>

A UV absorber preferably used in the base film will be described. The optical film of the present invention, including the above-described base film, is used in a polarizing plate, a member for a liquid crystal display, etc. and, in terms of preventing deterioration of a polarizing plate, a liquid crystal, etc., a UV absorber is preferably used. A UV absorber having an excellent ability of absorbing an ultraviolet ray at a wavelength of 370 nm or less and, in view of sound liquid crystal display property, having a little absorption of visible light at a wavelength of 400 nm or more is preferably used. Only one UV absorber may be used, or two or more UV absorbers may be used in combination. Examples of the UV absorber include those described in Japanese Patent Application Laid-Open No. 2001-72782 and Japanese National Publication of International Patent Application No. 2002-543265. Specific examples of the UV absorber include an oxybenzophenone-based compound, a benzotriazole-based compound, a salicylic acid ester-based compound, a benzophenone-based compound, a cyanoacrylate-based compound, and a nickel complex salt-based compound.

Among others, examples of a UV absorber include 2-(2'-hydroxy-5'-methylphenyl)benzotriazole, 2-(2'-hydroxy-3', 5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2,2-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-dihydroxybenzophenone, 2,2'-dihydroxy-4-methoxybenzophenone, 2-hydroxy-4-methoxy-5-sulfobenzophenone, bis(2-methoxy-4-hydroxy-5-benzoylphenylmethane), (2,4-bis-(n-octylthio)-6-(4-hydroxy-3,5-di-tert-butylanilino)-1,3,5-triazine, 2-(2'-hydroxy-3',5'-di-tert-butylphenyl)-5-chlorobenzotriazole, (2(2'-hydroxy-3',5'-di-tert-amylphenyl)-5-chlorobenzotriazole, 2,6-di-tert-butyl-p-cresol, pentaerythrityl-tetrakis[3-(3, 5-di-tert-butyl-4-hydroxyphenyl)propionate]-, triethylene glycol-bis[3-(3-tert-butyl-5-methyl-4-hydroxyphenyl)propionate], 1,6-hexanediol-bis[3-(3,5-di-tert-butyl-4-hydroxyphenyl)propionate], 2,4-bis-(n-octylthio)-6-(4-hydroxy-3,5-di-tert-butylanilino)-1,3,5-triazine, 2,2-thio-diethylenebis [3-(3,5-di-tert-butyl-4-hydroxyphenyl)propionate], octadecyl-3-(3,5-di-tert-butyl-4-hydroxyphenyl)propionate, N,N'-hexamethylenebis(3,5-di-tert-butyl-4-hydroxy-hydrocinnamide), 1,3,5-trimethyl-2,4,6-tris(3,5-di-tert-butyl-4-hydroxybenzyl)benzene, tris-(3,5-di-tert-butyl-4-hydroxybenzyl)-isocyanurate, etc. In particular, (2,4-bis-(n-octylthio)-6-(4-hydroxy-3,5-di-tert-butylanilino)-1,3,5-triazine, 2-(2'-hydroxy-3',5'-di-tert-butylphenyl)-5-chlorobenzotriazole, 2-(2'-hydroxy-3',5'-di-tert-amylphenyl)-5-chlorobenzotriazole, 2,6-di-tert-butyl-p-cresol, pentaerythrityl-tetrakis[3-(3,5-di-tert-butyl-4-hydroxyphenyl)propionate] and triethylene glycol-bis[3-(3-tert-butyl-5-methyl-4-hydroxyphenyl)propionate] are preferred. Also, for example, a hydrazine-based metal deactivator such as N,N'-bis[3-(3,5-di-tert-butyl-4-hydroxyphenyl)propionyl]hydrazine, or a phosphorus processing stabilizer such as tris(2,4-di-tert-butylphenyl)phosphite may be used in combination.

A UV absorber may also be introduced into a resin as a constitutional unit having an ultraviolet absorbing ability. Examples thereof include a benzotriazole derivative, a triazine derivative or a benzophenone derivative, in which a polymerizable group is introduced. The polymerizable group to be introduced may be appropriately selected according to the constitutional units in the resin.

Specific examples of a monomer include 2-(2'-hydroxy-5'-methacryloyloxy)ethylphenyl-2H-benzotriazole (trade name: RUVA-93, manufactured by Otsuka Chemical Co., Ltd.), 2-(2'-hydroxy-5'-methacryloyloxy)phenyl-2H-benzotriazole, and 2-(2'-hydroxy-3'-tert-butyl-5'-methacryloyloxy)phenyl-2H-benzotriazole.

(Other Additives)

In the above-described base film, additives such as a matting agent, a retardation developer, a plasticizer, a UV absorber, a deterioration inhibitor, a release agent, an infrared absorber and a wavelength dispersion adjuster may be added. These additives may be solid or oily substances. That is, the additives are not particularly limited in their melting point or boiling point. For example, UV absorbing materials having a temperature of 20° C. or less and 20° C. or more can be mixed, and plasticizers can be mixed in the same manner. Such mixtures are described, for example, in Japanese Patent Application Laid-Open No. 2001-151901. Further, infrared absorbing dyes are described, for example, in Japanese Patent Application Laid-Open No. 2001-194522. As for the timing of addition, an additive may be added at any time during the process of dope preparation. However, a further step of adding an additive may be added to the final preparation step of the dope preparation process. The amount of each material added is not particularly limited so long as its function is exerted. Also, in case where an optical film is a multilayer film, the type and amount of additive added in the respective layers may differ from each other, as described, for example, in Japanese Patent Application Laid-Open No. 2001-151902, etc. These techniques have been known in the prior art. Details thereof are described in JIII Journal of Technical Disclosure (Journal of Technical Disclosure No. 2001-1745, Mar. 15, 2001, Japan Institute of Invention and Innovation), pp. 16-22, and the materials described in detail therein are preferably used.

The above-described base film may also contain a rubbery particle, and examples of the rubbery particle include an acrylic particle such as a soft acrylic resin, an acryl rubber and a gum-acrylic graft-type core-shell polymer, or a styrene-elastomer copolymer. Further, additives capable of improving impact resistance and stress whitening resistance, as described, for example, in Examined Japanese Patent Application Publication No. S60-17406 and Examined Japanese Patent Application Publication No. H3-39095, are also preferably used.

When these additives are added, the total additive content in the base film is preferably 50% by mass or less and more preferably 30% by mass or less relative to the base film.

Thanks to such additives, the film is improved in brittleness, which in turn greatly improves the folding resistance test (for example, evaluation of cracks when bent by 180 degrees).

In addition, for achieving a low haze, it is preferred that the refractive index of the additives above is substantially the same as the refractive index of the base film, and the refractive index difference is preferably 0.5 or less and more preferably 0.3 or less.

<Properties of Base Film>

(Thickness of Base Film)

The thickness of the above-described base film is preferably from 5 to 100 μm, more preferably from 10 to 80 μm, particularly preferably from 15 to 70 μm and more particularly preferably from 20 to 60 μm. By controlling the film thickness to fall within the range above, it is possible to reduce panel unevenness involved in a change to the environment where a liquid crystal display device is placed after stacking a low moisture-permeable layer, that is, a change in temperature and humidity.

(Moisture Permeability of Base Film)

The moisture permeability of the base film is measured under the condition of 40° C. and a relative humidity of 90% based on JIS Z-0208.

The moisture permeability of the base film is preferably 300 g/m²/day or less, more preferably 250 g/m²/day or less, still more preferably 200 g/m²/day or less and particularly preferably 150 g/m²/day or less. By controlling the moisture permeability of the base film to fall within the range above, it is possible to prevent a liquid crystal cell of a liquid crystal display device, which is provided with an optical film having a low moisture-permeability layer stacked therein (the optical film of the present invention), from warping or causing light leakage over time in a normal temperature environment and a high-humidity environment and a high-temperature high-humidity environment.

(Moisture Permeability Per Unit Film Thickness of Base film)

As described above in the section entitled (Moisture Permeability Per Unit Film Thickness) in relation to a low moisture-permeable layer, the moisture permeability of a base film having a film thickness of 10 μm is provided by the following formula.

$$C_s(10\ \mu m)=J_s \times d_s/10 [g/m^2/day]$$

(wherein $d_s$[μm] is the thickness of the base film and $J_s$ is the moisture permeability of the base film).

The moisture permeability relative to the 10 μm film thickness of the base film is preferably from 50 to 2,000 g/m²/day, more preferably from 80 to 1,500 g/m²/day, still more preferably from 100 to 1,000 g/m²/day and particularly preferably from 150 to 800 g/m²/day.

(The moisture permeability is a value measured according to JIS Z-0208 after the lapse of 24 hours under a temperature of 40° C. and a relative humidity of 90%).

Also, the moisture permeability when the base film and the low moisture-permeable layer have a thickness of 10 μm [$C_b(10\ \mu m)/C_s(10\ \mu m)$] is preferably from 1.5 to 30, more preferably from 2 to 20 and particularly preferably from 3 to 10.

At the lower limiting value or more, a sufficient effect of reduced moisture permeation is achieved, and at the upper limiting value or less, curling can be prevented.

(Oxygen Permeation Coefficient of Base Film)

In order to reduce the moisture permeability, it is preferable to suppress the diffusion of water in the film. In other words, it is preferable to decrease the free volume of the film. In general, the free volume of the film correlates to the oxygen permeation coefficient of the film.

The oxygen permeation coefficient of the base film is preferably 100 cc·mm/(m²·day·atm) or less and more preferably 30 cc·mm/(m²·day·atm) or less.

(Equilibrium Moisture Content Rate of Base Film)

The moisture content (equilibrium moisture content) of the base film, when used as a polarizing plate protecting film, is preferably from 0 to 4% by mass, more preferably 0 to 2.5% by mass and still more preferably 0 to 1.5% by mass under a temperature of 25° C. and a relative humidity of 80% regardless of the film thickness in order to avoid harming the adhesion relative to the water soluble thermoplasticity such as polyvinyl alcohol. An equilibrium moisture content rate of 4% by mass or less is preferred in terms of preventing the moisture change-dependent retardation from overly increasing and preventing light leakage caused in a light crystal display device over time in a normal temperature environment, a high-humidity environment and a high-temperature high-humidity environment.

The water content rate can be measured by a process of calculating the amount of moisture (g) from a 7 mm×35 mm film sample according to the Karl Fisher method using a moisture meter and a water vaporizer for sample drying, "CA-03" and "VA-05" (both manufactured by Mitsubishi Chemical Corporation) and then the amount of moisture (g) divided by sample weights (g).

(Dimensional Change in Base film)

In terms of dimensional stability, the base film has a dimensional change rate of 0.5% or less in both cases where it is left standing 24 hours under a temperature of 60° C. and a relative humidity of 90% (high moisture) and where it is left standing 24 hours under a temperature of 80° C. and a dry environment (a relative humidity of 5% or less). The dimensional change rate is more preferably 0.3% or less and more preferably 0.15% or less.

<Method of Manufacturing Base Film>

A method of manufacturing the above-described base film preferably includes casting a polymer solution containing a thermoplastic resin and a solvent onto a support to form a polymer film (the base film) or forming the base film by melting a thermoplastic resin to form into a film. In other words, it is preferred that the base film is formed by casting the polymer solution containing a thermoplastic resin and a solvent onto a substrate or by melting a thermoplastic resin to form into a film, and it is more preferred that the base film is formed by melting a thermoplastic resin to form into a film.

(Surface Treatment)

In some cases, a base film is subjected to a surface treatment to thereby enhance the adhesion of the base film to a low moisture-permeable layer or other layers (for example, a polarizer, an undercoat layer or a back layer). For example, a glow discharge treatment, an ultraviolet irradiation treatment, a corona treatment, a flame treatment, and an acid or alkali treatment may be used. The glow discharge treatment as used herein may be a treatment with low-temperature plasma occurring in a low-pressure gas of $10^{-3}$ to 20 Torr, and a plasma treatment under atmospheric pressure is also preferred. A plasma-exciting gas refers to a gas excited by plasma under the above-described conditions and includes, for example, argon, helium, neon, krypton, xenon, nitrogen, carbon dioxide, fluorocarbons such as tetrafluoromethane, and a mixture thereof. Details thereof are described in JIII Journal of Technical Disclosure (Journal of Technical Disclosure No. 2001-1745, Mar. 15, 2001, Japan Institute of Invention and Innovation), pp. 30 to 32, and those described therein can be preferably used in the present invention.

{Functional Layer}

In the present invention, the optical film has the low moisture-permeable layer and may further have a functional layer at least on one surface. The functional layer is not particularly limited to specific types, but includes a hard coat layer, an antireflection layer (a layer where the refractive index is adjusted, such as a low refractive index layer, a medium refractive index layer and a high refractive index layer), an antiglare layer, an antistatic layer, a UV absorbing layer, an adhesion layer (a layer for enhancing the adherence between a substrate and a low moisture-permeable layer or a functional layer), etc.

One of these functional layers may be provided or two or more thereof may be provided. A method of stacking the functional layer is not particularly limited.

The functional layer may be stacked on the surface of a base film, on which a low moisture-permeable layer is stacked. In this case, the functional layer may or may not be in contact with the low moisture-permeable layer. The functional layer may be stacked on the surface on which the low moisture-permeable layer is not stacked. When two or more functional layers are stacked, one functional layer may be stacked on the low moisture-permeable layer and the other functional layer may be stacked on the surface on which the low moisture-permeable layer is not stacked. In particular, it is preferred that an additional functional layer may be formed by coating on the optical film of the present invention after stacking the low moisture-permeable layer on the optical film.

{Properties of Optical Film}

(Film Thickness of Optical Film)

The film thickness of the optical film of the present invention (the total film thickness after stacking a low moisture-permeable layer on a base film) is preferably from 5 to 100 μm, more preferably 10 to 18 pin and particularly preferably 15 to 75 μm.

[Layer Configuration of Optical Film]

The optical film of the present invention preferably has a low moisture-permeable layer on one surface of a base film and is a polarizing plate protecting film and at the same time a surface film of a liquid crystal display device. When the optical film of the present invention is a surface film, it is preferred to stack a hard coat layer. A preferred layer configuration for this case is described below.

Base film/Low Moisture-Permeable Layer/Hard Coat Layer

Base film/Adhesion Layer/Low Moisture-Permeable Layer/Hard Coat Layer

Base film/Hard Coat Layer/Low Moisture-Permeable Layer

Base film/Adhesion Layer/Hard Coat Layer/Low Moisture-Permeable Layer

Low Moisture-Permeable Layer/Base film/Hard Coat Layer

Base film/Low Moisture-Permeable Layer/Hard Coat Layer/Antireflection Layer

Base film/Hard Coat Layer/Low Moisture-Permeable Layer/Antireflection Layer

Low Moisture-Permeable Layer/Base film/Hard Coat Layer/Antireflection Layer

Base film/Low Moisture-Permeable Layer/Hard Coat Layer/Antireflection Layer/Antifouling Layer The optical film of the present invention may be preferably provided with a hard coat layer as a functional layer.

The hard coat layer as used in the present invention refers to a layer capable of increasing the pencil hardness of a transparent support if it is formed. For practical purposes, the pencil hardness (JIS K-5400-5-1) after stacking the hard coat layer is preferably H or more, more preferably 2H or more and most preferably 3H or more.

The thickness of the hard coat layer is preferably from 0.4 to 35 μm, more preferably from 1 to 30 μm and most preferably from 1.5 to 20 μm.

In the present invention, the hard coat layer may be one layer or may be a plurality of layers. In case where the hard coat layer is formed by a plurality of layers, the total thickness of all hard coat layers preferably falls within a higher thickness range.

The surface of the hard coat layer of the optical film in the present invention may be flat or uneven. Also, if necessary, a light-transmitting particle may be incorporated into the hard coat layer to impart surface unevenness or internal scattering.

[Hard Coat Layer-Forming Material]

In the present invention, the hard coat layer can be formed by coating a support with a composition containing an ethylenically unsaturated double bond-containing compound, a polymerization initiator, and if necessary, a light-transmitting particle, a fluorine-containing or silicone-based compound and a solvent directly or through another layer, and then drying and curing the coating. Respective components are described below.

[Compound Having Ethylenically Unsaturated Double Bond]

In the present invention, the hard coat layer-forming composition may contain a compound having an ethylenically unsaturated double bond. The compound having an ethylenically unsaturated double bond may function as a binder and is preferably a polyfunctional monomer having two or more polymerizable unsaturated groups. The polyfunctional monomer having two or more polymerizable unsaturated groups may function as a curing agent and enhance the strength or the scratch resistance of the coated film More preferably, three or more polymerizable unsaturated groups are used. As for these monomers, a monofunctional or bifunctional monomer may also be used in combination with a trifunctional or higher functional monomer.

As the compound having an ethylenically unsaturated double bond, a compound having a polymerizable functional group such as a (meth)acryloyl group, a vinyl group, a styryl group and an allyl group can be exemplified. Among others, a (meth)acryloyl group and $-C(O)OCH=CH_2$ are preferred. Particularly preferably, the following compounds containing three or more (meth)acryloyl groups in one molecule may be used.

Specific examples of the compound having a polymerizable unsaturated bond include (meth)acrylic acid diesters of an alkylene glycol, (meth)acrylic acid diesters of a polyoxyalkylene glycol, (meth)acrylic acid diesters of a polyhydric alcohol, (meth)acrylic acid diesters of an ethylene oxide or propylene oxide adduct, epoxy(meth)acrylates, urethane (meth)acrylates, and polyester(meth)acrylates.

Among others, esters of a polyhydric alcohol and a (meth)acrylic acid are preferred. Examples thereof include 1,4-butanediol di(meth)acrylate, 1,6-hexanediol di(meth)acrylate, neopentyl glycol(meth)acrylate, ethylene glycol di(meth)acrylate, triethylene glycol di(meth)acrylate, pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, polyester polyacrylate, and caprolactone-modified tris(acryloxyethyl) isocyanurate.

As polyfunctional acrylate-based compounds having a (meth)acryloyl group, commercially available ones may be used, such as NK Ester A-TMMT manufactured by Shin-Nakamura Chemical Co., Ltd., and KAYARAD DPHA manufactured by Nippon Kayaku Co., Ltd. Polyfunctional monomers are described in paragraphs [0114] to [0122] of Japanese Patent Application Laid-Open No. 2009-98658, and similarly described in the present invention.

As a compound having an ethylenically unsaturated double bond, a compound having a hydrogen-bondable substituent is preferred in terms of the adherence to a support, the low curling, and the immobilization of the fluorine-containing or silicon-based compound described below. The hydrogen-bondable substituent refers to a substituent in which an atom having high electronegativity, such as nitrogen, oxygen, sulfur and halogen, is covalently bonded to a hydrogen bond, and specifically includes OH—, SH—, —NH—, CHO—, CHN—, etc. Urethane(meth)acrylates and (meth)acrylates having a hydroxyl group are preferred. Commercially available polyfunctional acrylates having a (meth)acryloyl group may also be used, and examples thereof include NK Oligo U4HA and NK Ester A-TMM-3, both of which were manufactured by Shin-Nakamura Chemical Co., Ltd., and KAYARA DPET-30 manufactured by Nippon Kayaku Co., Ltd.

In order to fully increase the polymerization rate to thereby impart hardness, etc., the content of a compound having an ethylenically unsaturated double bond in the hard coat layer-forming composition of the present invention is preferably 50% by mass or more, more preferably from 60 to 99% by mass, still more preferably from 70 to 99% by mass and particularly preferably from 80 to 99% by mass, based on the total solid content in the hard coat layer-forming composition, except the inorganic components.

In the present invention, a compound having a cycloaliphatic hydrocarbon and an ethylenically unsaturated double bond in a molecule is also preferably used in the hard coat layer-forming composition. By using such a compound, low moisture permeability can be imparted to the hard coat layer. In order to enhance hard coat property, it is more preferable to use a compound having a cycloaliphatic hydrocarbon and two or more ethylenically unsaturated double bonds in a molecule.

In case where a hard coat layer-forming composition contains a compound having a cycloaliphatic hydrocarbon and an ethylenically unsaturated double bond in a molecule, the compound having a cycloaliphatic hydrocarbon and an ethylenically unsaturated double bond in a molecule is contained in amount of preferably from 1 to 90% by mass, more preferably from 2 to 80% by mass and particularly preferably from 5 to 70% by mass, based on an ethylenically unsaturated double bond-containing compound in the hard coat layer-forming composition.

In case where a hard coat layer-forming composition contains a compound having a cycloaliphatic hydrocarbon and an ethylenically unsaturated double bond in a molecule, it is preferable to further contain a pentafunctional or higher functional (meth)acrylate.

In case where a hard coat layer-forming composition further contains a pentafunctional or higher functional (meth)acrylate, the pentafunctional or higher functional (meth)acrylate is contained in an amount of preferably from 1 to 70% by mass, more preferably from 2 to 60% by mass and particularly preferably from 5 to 50% by mass, based on an ethylenically unsaturated double bond-containing compound in the hard coat layer-forming composition.

[Light-Transmitting Particle]

In the present invention, a light-transmitting particle may be introduced into a hard coat layer to thereby impart a concavo-convex shape to the surface of the hard coat layer surface or impart an internal haze.

A light-transmitting particle that can be used in a hard coat layer includes, for example, a polymethyl methacrylate particle (refractive index: 1.49), a crosslinked poly(acryl-styrene) copolymer particle (refractive index: 1.54), a melamine resin particle (refractive index: 1.57), a polycarbonate particle (refractive index: 1.57), a polystyrene particle (refractive index: 1.60), a crosslinked polystyrene particle (refractive index: 1.61), a polyvinyl chloride particle (refractive index: 1.60), a benzoguanamine-melamine formaldehyde particle (refractive index: 1.68), a silica particle (refractive index: 1.46), an alumina particle (refractive index: 1.63), a zirconia particle, a titania particle, and a particle having hollows or pores.

Among others, a crosslinked poly((meth)acrylate) particle and a crosslinked poly(acryl-styrene) particle are preferably used, and by adjusting the refractive index of a binder according to the refractive index of each light-transmitting particle selected from these particles, it is possible to achieve a surface unevenness, a surface haze, an internal haze and a total haze suitable for the hard coat layer of the optical film in the present invention.

The refractive index of a binder (light-transmitting resin) is preferably from 1.45 to 1.70 and more preferably 1.48 to 1.65.

Also, the refractive index difference between the light-transmitting particle and the binder of the hard coat layer ("a refractive index of the light-transmitting particle minus (−) a refractive index of the hard coat layer excluding the light-transmitting particle") has an absolute value that is preferably less than 0.05, more preferably from 0.001 to 0.030 and still more preferably from 0.001 to 0.020. When the refractive index difference between the light-transmitting particle and the binder in the hard coat layer is less than 0.05, it is possible to reduce the angle of refraction by the light-transmitting particle, prevent the scattered light distribution to a wide angle and prevent the occurrence of an adverse effect, such as depolarizing the light transmitted through an optically anisotropic layer.

In order to realize the above-described refractive index difference between the particle and the binder, the refractive index of the light-transmitting particle may be adjusted, or the refractive index of the binder may be adjusted.

A preferred first embodiment is to use, in combination, a binder (refractive index after curing: from 1.50 to 1.53) containing a trifunctional or higher functional (meth)acrylate monomer as the main component and a light-transmitting particle composed of a crosslinked poly(meth)acrylate/styrene polymer having an acrylic content of 50 to 100% by mass. The refractive index difference between the light-transmitting particle and the binder can be easily adjusted to less than 0.05 by adjusting the composition ratio of an acryl component having a low refractive index to a styrene component having a high refractive index. The mass ratio of the acryl component to the styrene component is preferably from 50/50 to 100/0, more preferably from 60/40 to 100/0 and most preferably from 65/35 to 90/10. The refractive index of the light-transmitting particle composed of a crosslinked poly(meth)acrylate/styrene polymer is preferably from 1.49 to 1.55, more preferably from 1.50 to 1.54 and most preferably from 1.51 to 1.53.

A second preferred embodiment is to use an inorganic fine particle having an average particle size of 1 to 100 nm in combination with a binder containing, as the main component, a trifunctional or higher functional (meth)acrylate monomer, wherein the refractive index of the binder composed of the monomer and the inorganic fine particle is adjusted to thereby adjust the refractive index difference from the existing light-transmitting particle. The inorganic particle includes an oxide of at least one metal selected from silicon, zirconium, titanium, aluminum, indium, zinc, tin and antimony, and specific examples thereof include $SiO_2$, $ZrO_2$, $TiO_2$, $Al_2O_3$, $In_2O_3$, $ZnO$, $SnO_2$, $Sb_2O_3$ and ITO. $SiO_2$, $ZrO_2$, $Al_2O_3$, etc., are preferred. These types of inorganic particle can be used by mixing in an amount of 1 to 90% by mass and preferably in an amount of from 5 to 65% by mass based on the total monomer amount.

Here, the refractive index of the hard coat layer, excluding the light-transmitting particle, can be quantitatively evaluated by directly measuring the refractive index with an Abbe refractometer or by measuring a spectral reflectance spectrum or spectral ellipsometry. The refractive index of the light-transmitting particle is measured in a method wherein the light-transmitting particles are dispersed in an equal amount in solvents prepared by changing the mixing ratio of two different solvents having different refractive indexes and thereby varying the refractive index to measure turbidity, and the refractive index of the solvent when the turbidity is minimum is measured by an Abbe refractometer.

The average particle diameter of the light-transmitting particle is preferably from 1.0 to 12 μm, more preferably from 3.0 to 12 μm, still more preferably from 4.0 to 10.0 μM and most preferably from 4.5 to 8 μm. By limiting the refractive index difference and the particle size to the range above, the distribution of a scattered light angle does not extend to a wide angle, and blurring of characters or contrast reduction on the display is unlikely caused. Since it is unnecessary to increase the film thickness of a layer to which the particle is added and a problem, such as curling or a cost rise, hardly occurs, the particle diameter is preferably 12 μm or less. Furthermore, a particle diameter limited to the above-described range is preferred in that the amount coated at the time of coating can be reduced, the drying is completed fast, and a planar defect such as drying unevenness scarcely occurs.

As a method for measuring the average particle diameter of a light-transmitting particle, any measurement method may be applied as long as it measures the average particle diameter of particles. Preferably, however, 100 particles are observed by observing particles through a transmission electron microscope (magnification rate: from 500,000 to 2,000,000 times) and the average value thereof can be used as an average particle diameter.

The shape of a light-transmitting particle is not particularly limited, but a spherical shape particle may also be used in combination with a light-transmitting particle having a different shape, such as an irregularly shaped particle (e.g., non-spherical particle). In particular, if the short axis of a non-spherical particle is aligned in the normal direction of a hard coat layer, it is possible to use a particle having a smaller particle diameter than a spherical particle.

The above-described light-transmitting particle is preferably blended to be contained in an amount of 0.1 to 40% by mass, more preferably from 1 to 30% by mass and still more preferably from 1 to 20% by mass in the total solid content of a hard coat layer. By limiting the blending ratio of the light-transmitting particle to the range above, it is possible to control the internal haze such that it falls within a preferred range.

The amount of a light-transmitting particle coated is preferably from 10 to 2,500 mg/m$^2$, more preferably from 30 to 2,000 mg/m$^2$ and still more preferably from 100 to 1,500 mg/m$^2$.

<Method for Preparation, Classification of Light-Transmitting Particle>

Examples of a method of manufacturing a light-transmitting particle include a suspension polymerization method, an emulsion polymerization method, a soap-free emulsion polymerization method, a dispersion polymerization method, a seed polymerization method, etc., and any of these methods may be used. Regarding these manufacturing methods, reference may be made, for example, to the description in "Experimental Method of Polymer Synthesis (co-authored by Takayuki Otsu and Masayoshi Kinoshita, published by Kagaku-Dojin Publishing Company, Inc.), pages 130, 146 and 147, and further reference may be made to the methods described in "Synthetic Polymer," Vol. 1, pp. 246-290, and Vol. 3, pp. 1-108, and the methods described in the specification of Japanese Patent Nos. 2,543,503, 3,508,304, 2,746,275, 3,521,560 and 3,580,320 and the specification of Japanese Patent Application Laid-Open Nos. H10-1561, H7-2908, H5-297506 and 2002-145919.

For particle size distribution of a light-transmitting particle, a monodispersed particle is preferred in terms of the control of haze value and diffusibility and the uniformity of coated surface. A CV value indicative of the uniformity of particle diameter is preferably 15% or less, more preferably 13% or less and still more preferably 10% or less. Further, when a particle having a particle size larger 20% or more than the average particle size is defined as a coarse particle, the proportion of the coarse particle is preferably 1% or less, more preferably 0.1% or less and still more preferably 0.01% or less, based on the total number of particles. For obtaining particles having such a particle size distribution, it is an effective method to classify the particles after the preparation or synthesis reaction thereof, and particles having a desired distribution can be obtained by increasing the number of classifications or by intensifying the degree of classification.

In classification, an air classification method, a centrifugal classification method, a sedimentation classification method, a filtration classification method or an electrostatic classification method is preferably used.

[Thickening Agent]

In order to adjust the viscosity of a coating solution, a thickening agent may be used.

The thickening agent as used herein means a substance capable of increasing the viscosity of a solution when it is added.

Such a thickening agent includes, but is not limited to, those listed below.

Poly-ε-caprolactone
Poly-ε-caprolactone diol
Poly-ε-caprolactone triol
Polyvinyl acetate
Poly(ethylene adipate)
Poly(1,4-butylene adipate)
Poly(1,4-butylene glutarate)
Poly(1,4-butylene succinate)
Poly(1,4-butylene terephthalate)
Poly(ethylene terephthalate)
Poly(2-methyl-1,3-propylene adipate)
Poly(2-methyl-1,3-propylene glutarate)
Poly(neopentyl glycol adipate)
Poly(neopentyl glycol sebacate)
Poly(1,3-propylene adipate)
Poly(1,3-propylene glutarate)
Polyvinylbutyral
Polyvinylformal
Polyvinylacetal
Polyvinylpropanal
Polyvinylhexanal
Polyvinylpyrrolidone
Polyacrylic acid ester
Polymethacrylic acid ester
Cellulose acetate
Cellulose propionate
Cellulose acetate butyrate In addition, as known viscosity adjusting agents or thixotropic imparting agents, layered compounds, such as smectite, mica, bentonite, silica and montmorillonite, and sodium polyacrylate described in Japanese Patent Application Laid-Open No. H8-325491, and ethyl cellulose, polyacrylic acid and organic clay described in Japanese Patent Application Laid-Open No. H10-219136, may be used. As a thixotropic imparting agent, a compound obtained by organically modifying a layered compound having a particle diameter of 0.3 μm or less is particularly preferred and a particle diameter of 0.1 μm or less is more preferred. The particle diameter of a layered compound may be regarded as the length of a longitudinal axis. Usually, approximately 1 to 10 parts by mass per 100 parts by mass of a UV-curable resin is appropriate.

[Photopolymerization Initiator]

It is preferred to introduce a photopolymerization initiator into a hard coat layer-forming composition. The photopolymerization initiator described in relation to the low moisture-permeable layer can also be preferably used in the hard coat layer-forming composition.

A photopolymerization initiator in a hard coat layer-forming composition is contained in an amount that is large enough to polymerize a polymerizable compound contained in the hard coat layer-forming composition while being small enough to prevent the starting point from being overly retarded. For this reason, the content of the photo polymerization initiator in the hard coat layer-forming composition is preferably from 0.5 to 8% by mass and more preferably from 1 to 5% by mass, based on the total solid content in the hard coat layer-forming composition.

[UV Absorber]

The optical film of the present invention can be used in a polarizing plate or a liquid crystal display device member. In terms of preventing deterioration of a polarizing plate or a liquid crystal, the optical film may be given a UV absorbent property by containing a UV absorber in a hard coat layer to the extent that UV curing is not inhibited.

[Solvent]

In the present invention, a hard coat layer-forming composition may contain a solvent. As a solvent, different types of solvent may be used by taking into account the solubility of monomers, the dispersibility of light-transmitting particles, the drying property at the time of coating, and the like. Such an organic solvent includes, for example, dibutyl ether, dimethoxyethane, diethoxyethane, propylene oxide, 1,4-dioxane, 1,3-dioxolane, 1,3,5-trioxane, tetrahydrofuran, anisole, phenetole, dimethyl carbonate, methyl ethyl carbonate, diethyl carbonate, acetone, methyl ethyl ketone (MEK), diethyl ketone, dipropyl ketone, diisobutyl ketone, cyclopentanone, cyclohexanone, methylcyclohexanone, ethyl formate, propyl formate, pentyl formate, methyl acetate, ethyl acetate, propyl acetate, methyl propionate, ethyl propionate, γ-butyrolactone, methyl 2-methoxyacetate, methyl 2-ethoxyacetate, ethyl 2-ethoxyacetate, ethyl 2-ethoxypropionate, 2-methoxyethanol, 2-propoxyethanol, 2-butoxyethanol, 1,2-diacetoxyacetone, acetylacetone, diacetone alcohol, methyl acetoacetate, ethyl acetoacetate, methyl alcohol, ethyl alcohol, isopropyl alcohol, n-butyl alcohol, cyclohexyl alcohol, isobutyl acetate, methyl isobutyl ketone (MIBK), 2-octanone, 2-pentanone, 2-hexanone, ethylene glycol ethyl ether, ethylene glycol isopropyl ether, ethylene glycol butyl ether, propylene glycol methyl ether, ethyl carbitol, butyl carbitol, hexane, heptane, octane, cyclohexane, methylcyclohexane, ethylcyclohexane, benzene, toluene, and xylene. One of these solvents may be used alone or two or more thereof may be used in combination.

In the present invention, a solvent is preferably used such that the solid content concentration of the hard coat layer-forming composition ranges from 20 to 80% by mass, more preferably from 30 to 75% by mass and still more preferably from 40 to 70% by mass.

[Antireflection Layer]

It is also a preferred embodiment of the present invention to stack an antireflection layer on a hard coat layer as described above. In the present invention, a known antireflection layer may be preferably used. In particular, a UV curable antireflection layer is preferred.

An antireflection layer may be a low reflectance single layer having a film thickness of λ/4 or may have a multilayer configuration, but a low reflectance single layer having a film thickness of λ/4 is particularly preferred. Low refractive material that can be preferably used in the present invention will be described below, but the present invention is not limited thereto.

[Materials for Low Refractive Index Layer]

Materials for a low refractive index layer will be described below.

[Inorganic Fine Particle]

In terms of reducing the refractive index and improving the scratch resistance, it is preferable to use an inorganic fine particle in a low refractive index layer. The inorganic fine particle is not particularly limited as long as it has an average particle size of from 5 to 120 nm. In terms of reducing the refractive index, however, an inorganic particle having a low refractive index is preferred.

An inorganic fine particle has a low refractive index and thus includes a magnesium fluoride fine particle and a silica fine particle. Particularly in terms of refractive index, dispersion stability and cost, a silica fine particle is preferred. The size (primary particle diameter) of such inorganic particles is preferably from 5 to 120 nm, more preferably from 10 to 100 nm, from 20 to 100 nm and most preferably from 30 to 90 nm.

If the diameter of an inorganic fine particle is excessively small, the effect in improving the scratch resistance is reduced, and the diameter is excessively large, fine concave and convex portions are formed on the surface of a low refractive layer, thereby deteriorating the appearance such as denseness of black or the integrated reflectance. Further, when a hollow silica fine particle described below is used, a particle having an excessively small diameter has a void portion with a reduced proportion, and thus, sufficient reduction in refractive index may not be expected. An inorganic fine particle may be either crystalline or amorphous and may be a monodispersed particle or even an aggregate particle as long as a predetermined particle diameter is satisfied. Most preferred is a spherical shape, but optionally an indefinite shape.

The amount of the inorganic fine particle coated is preferably from 1 mg/m$^2$ to 100 mg/m$^2$, more preferably from 5 mg/m$^2$ to 80 mg/m$^2$ and still more preferably from 10 mg/m$^2$ to 60 mg/m$^2$. If the coated amount is excessively small, a sufficient reduction in refractive index is not expected or the effect of improving the scratch resistance may decrease, whereas if it is excessively large, fine irregularities are generated on a low refractive index layer surface, thereby deteriorating the appearance such as non-loosening of black or the integrated reflectance.

(Porous or Hollow Fine Particle)

In order to reduce the refractive index, a fine particle having a porous or hollow structure is preferably used.

Among others, it is preferable to use a silica particle having a hollow structure. The porosity of these particles is preferably from 10 to 80%, more preferably from 20 to 60% and most preferably from 30 to 60%. Keeping the porosity of the hollow fine particle within the above-described range is preferred in terms of reducing the refractive index and maintaining the durability of particles.

In case where the porous or hollow particle is silica, the refractive index of the fine particle is preferably from 1.10 to 1.40, more preferably from 1.15 to 1.35 and most preferably from 1.15 to 1.30. This refractive index herein indicates the total particle refractive index, and not indicating only the refractive index of silica in the outer shell forming a silica particle.

In addition, two or more different hollow silica particles that are different from each other in average particle size may be used in combination. Here, the average particle diameter of the hollow silica particle can be determined from an electron micrograph.

In the present invention, the specific surface area of the hollow silica is preferably from 20 to 300 m$^2$/g, more preferably from 30 to 120 m$^2$/g and most preferably from 40 to 90 m$^2$/g. The surface area can be measured according to BET using nitrogen.

In the present invention, a void-free silica particle may be used in combination with hollow silica. The particle size of the void-free silica is preferably from 30 to 150 nm, more preferably from 35 to 100 nm and most preferably from 40 to 80 nm.

[Method for Surface Treatment of Inorganic Fine Particle]

Also, in the present invention, an inorganic fine particle can be used after surface treatment with a silane coupling agent, etc., in a conventional manner.

Particularly, in order to improve dispersibility in a low refractive index layer-forming binder, the surface of inorganic fine particles is preferably treated with a hydrolysate of an organosilane compound and/or a partial condensate thereof, and it is more preferred that either one or both of an acid catalyst and a metal chelate compound are used in the treatment. The method for surface treatment of an inorganic fine particle is described in paragraphs [0046] to [0076] of Japanese Patent Application Laid-Open No. 2008-242314, and an organosilane compound, a siloxane compound, a surface treatment solvent, a surface treatment catalyst, a metal chelate compound, etc. described in this document can also be suitably used in the present invention.

In a low refractive index layer, (b2) a fluorine-containing or fluorine-free monomer having a polymerizable unsaturated group may be used. As the fluorine-free monomer, it is preferable to use a compound having an ethylenically unsaturated double bond described as being usable in a hard coat layer. As the fluorine-containing monomer, it is preferable to use (d) a fluorine-containing polyfunctional monomer that is represented by following Formula (1), in which fluorine is contained in an amount of 35% by mass or more and the calculated value of the total inter-crosslink molecular weight is less than 500.

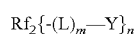  Formula (1):

(in Formula (1), Rf$_2$ represents an n-valent group containing at least a carbon atom and a fluorine atom, n represents an integer of 3 or more, L represents a single bond or a divalent linking group, m represents 0 or 1, and Y represents a polymerizable unsaturated group).

Rf$_2$ may contain at least either an oxygen atom or a hydrogen atom. Also, Rf$_2$ is chained (linear or branched) or cyclic.

Y is preferably a group containing two carbon atoms forming an unsaturated bond, more preferably a radical-polymerizable group and still more preferably a group selected from a (meth)acryloyl group, an allyl group, an α-fluoroacryloyl group and —C(O)OCH═CH$_2$. Among others, radical polymerizable grouse, such as a (meth) acryloyl group, an allyl group, an α-fluoroacryloyl group and —C(O)OCH═CH$_2$, are more preferred in terms of polymerizability.

L represents a divalent linking group and specifically represents an alkylene group having 1 to 10 carbon atoms, an arylene group having 6 to 10 carbon atoms, —O—, —S—, —N(R)—, a group obtained by combining an alkylene group having 1 to 10 carbon atoms and —O—, —S— or NR—, or a group obtained by combining an arylene group having 6 to 10 carbon atoms and —O—, —S— or NR—. R represents a hydrogen atom or an alkyl group having 1 to 5 carbon atoms. In case where L represents an alkylene group or an arylene group, the alkylene group or arylene group represented by L is preferably substituted with a halogen atom and substituted with a fluorine atom.

Specific examples of the compound represented by Formula (1) are described in paragraphs [0121] to [0163] of Japanese Patent Application Laid-Open No. 2010-152311.

[Optically Anisotropic Layer]

In the present invention, an optically anisotropic layer may also be provided in the optical film. The optically anisotropic layer may be an optically anisotropic layer where a film having a constant retardation is formed uniformly in plane, or an optically anisotropic layer patterned such that retardation regions having different slow directions or different retardation values are regularly arranged in-plane.

As described above, the optical film of the present invention is preferably a surface film in a liquid crystal display device on which a hard coat layer is stacked. When the optical film of the present invention has both hard coat layer and optically anisotropic layer, the optically anisotropic layer is preferably formed through a base film on a surface where a hard coat layer is not formed.

In the optical film having such an aspect, a low moisture-permeable layer may be stacked on the same side as the hard coat layer relative to the base film, may be provided on the side opposite the hard coat layer, or may be stacked on both surfaces of the base film.

As for the preferred layer configuration when the low moisture-permeable layer is stacked on the same side as the hard coat layer relative to the base film, the above-described preferred layer configuration seen in the case of stacking a hard coat layer may be employed.

On the other hand, when the low moisture-permeable layer is stacked on the same side as the hard coat layer and the optically anisotropic layer relative to the base film, the low moisture-permeable layer may be stacked between the base film and the optically anisotropic layer, or the base film, the optically anisotropic layer and the low moisture-permeable layer may be stacked in the listed order.

The materials and manufacturing conditions of an optically anisotropic layer may be selected according to its uses, but in the present invention, an optically anisotropic layer using a polymerizable liquid crystalline compound is preferred. In this case, it is also a preferred embodiment that forms an alignment film between the optically anisotropic layer and the base film such that the alignment film is in contact with the optically anisotropic layer.

Preferred examples of a film having an optically anisotropic layer formed uniformly in plane include an embodiment wherein an optically anisotropic layer is a λ/4 film, and this embodiment is particularly useful as a member of an active-type 3D liquid crystal display device. An embodiment that has a λ/4 film as an optically anisotropic layer and a hard coat layer, which are stacked on opposite surfaces through a base film, is described in Japanese Patent Application Laid-Open Nos. 2012-098721 and 2012-127982, and such an embodiment may be preferably used in the optical film of the present invention.

On the other hand, preferred examples of an optically anisotropic layer having formed therein a pattern include a pattern-type λ/4 film, and embodiments described in Japanese Patent Nos. 4825934 and 4887463 may be preferably used in the optical film of the present invention.

In addition, an embodiment described in Japanese National Publication of International Patent Application No. 2012-517024 (WO2010/090429), wherein a photo-alignment film and patternwise exposure are combined, may also be preferably used in the optical film of the present invention.

[Layer Configuration of Optical Film Having Optically Anisotropic Layer]

Preferred layer configurations of the optical film having an optically anisotropic layer in the present invention will be described in the following.

Optically Anisotropic Layer/Base film/Low Moisture-Permeable Layer/Hard Coat Layer Optically Anisotropic Layer/Low Moisture-Permeable Layer/Base film//Hard Coat Layer Low Moisture-Permeable Layer/Optically Anisotropic Layer/Base film/Hard Coat Layer Optically Anisotropic Layer/Base film/Low Moisture-Permeable Layer/Hard Coat Layer/Antireflection Layer Optically Anisotropic Layer/Low Moisture-Permeable Layer/Base film//Hard Coat Layer/Antireflection Layer Low Moisture-Permeable Layer/Optically Anisotropic Layer/Base film/Hard Coat Layer/Antireflection Layer In case of having an optically anisotropic layer, the optically anisotropic layer is preferably formed of a liquid crystalline compound having a curable group such as unsaturated polymerizable group, and an alignment film is preferably formed under a liquid crystal layer. In the present invention, it is also preferred that the alignment film is formed of a curable composition containing a radical polymerizable compound. In that event, the layer configurations described below are particularly preferred.

Optically Anisotropic Layer/Low Moisture-Permeable Layer/Base film//Hard Coat Layer Optically Anisotropic Layer/Low Moisture-Permeable Layer/Base film//Hard Coat Layer/Antireflection Layer

[Polarizing Plate]

The polarizing plate of the present invention is characterized by having a polarizer and at least one optical film of the present invention as a protective film of the polarizer.

The optical film of the present invention may be used as a protective film for the polarizing plate. In this case, a method for manufacturing the polarizing plate is not particularly limited, and the polarizing plate can be manufactured by a conventional method. There is a method wherein an obtained optical film is alkali-treated and bonded to both surfaces of a polarizer produced by dipping a polyvinyl alcohol film in an iodine solution and stretching the film, by using a completely saponified polyvinyl alcohol aqueous solution. In place of an alkali treatment, easy adhesion processing may be performed as described in Japanese Patent Application Laid-Open Nos. H6-94915 and H6-118232. Also, the above-described surface treatment may be performed. The surface of the optical film, which is bonded to the polarizer, may be a surface where a low moisture-permeable layer is stacked or a surface where a low moisture-permeable layer is not stacked.

An adhesive used in bonding the treated surface of the protective film and the polarizer includes, for example, a polyvinyl alcohol-based adhesive such as polyvinyl alcohol and polyvinylbutyral, and a vinyl-based latex such as butyl acrylate.

A polarizing plate consists of a polarizer and protective films for protecting both surfaces thereof and is configured such that a protective film is bonded to one surface of the polarizing plate and a separate film is bonded to the opposite surface. The protective film and the separate film are used for purposes of protecting the polarizing plate at the time of shipment of the polarizing plate, product inspection, etc. In this case, the protective film is bonded for purposes of protecting the surface of the polarizing plate and is used on a surface opposite the surface of the polarizing plate, which is bonded to a liquid crystal plate. In addition, the separate film is used for purposes of covering an adhesive layer bonded to the liquid crystal plate and is used on the surface of the polarizing plate surface, which is bonded to the liquid crystal plate.

[Liquid Crystal Display Device]

The liquid crystal display device of the present invention is characterized by including a liquid crystal cell and the polarizing plate of the present invention disposed on at least one surface of the liquid crystal cell, wherein the optical film of the present invention contained in the polarizing plate is disposed such that it becomes the outermost surface layer.

(Configuration of General Liquid Crystal Display Device)

A liquid crystal display device has a configuration in which a liquid crystal cell is provided by carrying a liquid crystal between two electrode substrates, two polarizing plates are disposed on both sides thereof, and if necessary, at least one optical compensation film is disposed between the liquid crystal cell and the polarizing plate.

The liquid crystal layer of the liquid crystal cell is usually formed by encapsulating a liquid crystal in a space formed by interposing a spacer between two substrates. A transparent electrode is formed, on a substrate, as a transparent film containing a conductive substance. In the liquid crystal cell, a gas barrier layer, a hard coat layer or an undercoat layer (used for adhering the transparent electrode layer) may be further provided. These layers are usually provided on the substrate. A substrate of a liquid crystal cell generally has a thickness of 50 µM to 2 mm.

A liquid crystal display device is generally provided with a substrate containing a liquid crystal cell between two polarizing plates. The polarizing plate protective film provided by the optical film of the present invention may be used as a protective film for either one of the two polarizing plates, but is preferably used, out of two protective films of the respective polarizing plates, as a protective film disposed on the outer side of the liquid crystal cell relative to the polarizer.

In particular, the optical film of the present invention is preferably disposed as a viewing-side protective film of a viewing-side polarizing plate out of the two polarizing plates.

Also preferred is an embodiment in which after the optical film of the present invention is disposed as a viewing-side protective film of a viewing-side polarizing plate out of the two polarizing plates, the optical film of the present invention is further disposed for a backlight-side protective film of a backlight-side polarizing plate, thereby suppressing the expansion and shrinkage of polarizers contained in the two polarizing plates and preventing the warpage of a panel.

(Types of Liquid Crystal Display Device)

The film of the present invention can be used in different modes of a liquid crystal cell. Different display modes such as TN (Twisted Nematic), IPS (In-Plane Switching), FLC (Fenoelectric Liquid Crystal), AFLC (Anti-Ferroelectric Liquid Crystal), OCB (Optically Compensatory Bend), STN (Super Twisted Nematic), VA (Vertically Aligned), ECB (Electrically Controlled Birefringence) and HAN (Hybrid Aligned Nematic) have been proposed. Furthermore, display modes obtained by alignment division of the display modes above have also been proposed. The optical film of the present invention is effective in a liquid crystal display device in any display mode and is also effective in any of a transmission type, a reflection type and a transflective type liquid crystal display device.

EXAMPLES

The present invention will be described in more detail below with reference to Examples. Materials, reagents, amounts and ratios of substances, operations, etc. described in the following Examples can be appropriately changed or modified without departing from the purport of the present invention. Accordingly, the present invention is not limited to the Examples.

Manufacturing Example 1

(Manufacture of Purified Rosin R)

In a sealable reactor vessel equipped with a stirrer, a reflux condenser, a nitrogen intake tube, 3,000 g of an unrefined gum rosin made in China (having an acid number of 171 mgKOH/g, a softening point of 74° C., and a color tone of 6G) was introduced and distilled under a reduced pressure of 400 Pa while purging with nitrogen to finally obtain a main residue having an acid value of 176.3 mgKOH/g, a softening point of 80.5° C. and a color (Gardner) of 2 (a yield rate of 86.3%) as a refined gum rosin R. The resin acid number was measured according to a method defined in JIS K-5601. Also, the softening point was measured by the ring and ball softening method defined in JIS K-2531.

(Manufacture of Unsaturated Acid-Modified Rosin A)

In reactor vessel equipped with a stirrer, a reflux condenser having a water distributor, and a thermometer, 1,000 parts by mass of the refined gum rosin R manufactured as described above was introduced and agitated under a nitrogen atmosphere with elevating the temperature to 180° C. to result in a melt. Then, 267 parts by mass of a fumaric acid was introduced and agitated with elevating the temperature to 230° C., and after being kept at the elevated temperature for 1 hour, was cooled to obtain a solid resin of an unsaturated acid-modified rosin A. The resin acid number was 342.0 mgKOH/g and the softening point was 125° C.

(Manufacture of Unsaturated Acid-Modified Rosin B)

With reference to Preparation Example 3 disclosed in Japanese Patent Application Laid-Open No. 2007-111735 and by using the above-described refined gum rosin R and a maleic acid, a maleic acid-modified rosin was synthesized. The resin acid number was 315 mgKOH/g and the softening point was 155° C.

(Manufacture of Unsaturated Acid-Modified Rosin C)

With reference to Preparation Example 2 disclosed in Japanese Patent Application Laid-Open No. 2007-111735 and by using the above-described refined gum rosin R and an acrylic acid, an acrylic acid-modified rosin was synthesized. The resin acid number was 241 mgKOH/g and the softening point was 130° C.

(Manufacture of Hydrogenated Rosin D)

With reference to Example 1 in Japanese Patent Application Laid-Open No. 2001-181400, a hydrogenated rosin was synthesized. The acid number was 176 mgKOH/g and the softening point was 80° C.

Manufacturing Example 2

(Preparation of Low Moisture-Permeable Layer-Forming Composition)

This composition was prepared as follows.

(Composition of Low Moisture-Permeable Layer-Forming Composition BL-1)

| A-DCP | 77.0 parts by mass |
| Unsaturated Acid-Modified Rosin A | 20.0 parts by mass |
| (Acid Number: 342 mgKOH/g) | |
| Irgacure 907 | 3.0 parts by mass |
| SP-13 | 0.04 parts by mass |
| MEK (methylethylketone) | 40.9 parts by mass |
| Methyl Acetate | 40.9 parts by mass |

The solid concentration of Low Moisture-Permeable Layer-Forming Composition BL-1 was 55% by mass.

(Composition of Low Moisture-Permeable Layer-Forming Composition BL-2)

| A-DCP | 77.0 parts by mass |
| Unsaturated Acid-Modified Rosin B | 20.0 parts by mass |
| (Acid Number: 315 mgKOH/g) | |
| Irgacure 907 | 3.0 parts by mass |
| SP-13 | 0.04 parts by mass |
| MEK | 40.9 parts by mass |
| Methyl Acetate | 40.9 parts by mass |

The solid concentration of Low Moisture-Permeable Layer-Forming Composition BL-2 was 55% by mass.

(Composition of Low Moisture-Permeable Layer-Forming Composition BL-3)

| A-DCP | 77.0 parts by mass |
| Unsaturated Acid-Modified Rosin C | 20.0 parts by mass |
| (Acid Number: 241 mgKOH/g) | |
| Irgacure 907 | 3.0 parts by mass |
| SP-13 | 0.04 parts by mass |
| MEK | 40.9 parts by mass |
| Methyl Acetate | 40.9 parts by mass |

The solid concentration of Low Moisture-Permeable Layer-Forming Composition BL-3 was 55% by mass.

(Composition of Low Moisture-Permeable Layer-Forming Composition BL-4)

| A-DCP | 77.0 parts by mass |
| PINECRYSTAL KE604 | 20.0 parts by mass |
| (Acid Number: 238 mgKOH/g) | |
| Irgacure 907 | 3.0 parts by mass |
| SP-13 | 0.04 parts by mass |
| MEK | 40.9 parts by mass |
| Methyl Acetate | 40.9 parts by mass |

The solid concentration of Low Moisture-Permeable Layer-Forming Composition BL-4 was 55% by mass.

(Composition of Low Moisture-Permeable Layer-Forming Composition BL-5)

| A-DCP | 77.0 parts by mass |
| PINECRYSTAL KR614 | 20.0 parts by mass |
| (Acid Number: 175 mgKOH/g) | |
| Irgacure 907 | 3.0 parts by mass |
| SP-13 | 0.04 parts by mass |
| MEK | 40.9 parts by mass |
| Methyl Acetate | 40.9 parts by mass |

The solid concentration of Low Moisture-Permeable Layer-Forming Composition BL-5 was 55% by mass.

<Preparation of Low Moisture-Permeable Layer-Forming Composition BL-6 to BL-17>

Except that a low moisture-permeable layer-forming composition used to prepare Low Moisture-Permeable Layer-Forming Composition BL-1 was prepared as described in the table below, Low Moisture-Permeable Layer-Forming Composition BL-6 to BL17 was prepared in the same manner as Low Moisture-Permeable Layer-Forming Composition BL-1.

The materials used are listed below.

A-DCP: Tricyclodecanedimethanol diacrylate [manufactured by Shin-Nakamura Chemical Co., Ltd.]

DCP: Tricyclodecanedimethanol dimethacrylate [manufactured by Shin-Nakamura Chemical Co., Ltd.]

FA-513AS: Dicyclopentanyl acrylate [manufactured by Hitachi Chemical Co., Ltd.]

FA-513M: Dicyclopentanyl methacrylate [manufactured Hitachi Chemical Co., Ltd.]

AA-BPEF: 9,9-bis[4-(2-acryloyloxyethoxy)phenyl]fluorene [manufactured by Shin-Nakamura Chemical Co., Ltd.]

PET30: Mixture of pentaerythritol tetraacrylate and pentaerythritol triacrylate (manufactured by Nippon Kayaku Co., Ltd.]

PINECRYSTAL KR614 (trade name of a ultra-light color rosin manufactured by Arakawa Chemical Industries, Ltd.)

PINECRYSTAL KE604 (trade name of an acid-modified ultra-light color rosin, manufactured by Arakawa Chemical Industries, Ltd.)

Irgacure 907: Polymerization initiator [manufactured by BASF]

Leveling Agent

SP-13 (in the following formula, a composition ratio of 60:40 is a molar ratio):

[Chem. 14]

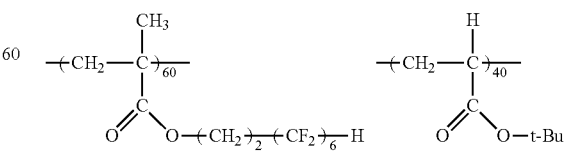

In the table below, the unit of the numerical value indicates parts by mass.

TABLE 1

| Low moisture-permeable layer-forming composition | BL-1 | BL-2 | BL-3 | BL-4 | BL-5 | BL-6 | BL-7 | BL-8 | BL-9 |
|---|---|---|---|---|---|---|---|---|---|
| Alicyclic compound or fluorene compound (Details) | 77.0 | 77.0 | 77.0 | 77.0 | 77.0 | 57.0 | 51.0 | 87.0 | 92.0 |
| A-DCP | 77.0 | 77.0 | 77.0 | 77.0 | 77.0 | 57.0 | 51.0 | 87.0 | 92.0 |
| DCP | | | | | | | | | |
| AA-BPEF | | | | | | | | | |
| FA-513AS | | | | | | | | | |
| FA-513M | | | | | | | | | |
| PET30 | | | | | | | | | |
| Unsaturated acid-modified rosin A | 20.0 | | | | | 40.0 | 46.0 | 10.0 | 5.0 |
| Unsaturated acid-modified rosin compound B | | 20.0 | | | | | | | |
| Unsaturated acid-modified rosin compound C | | | 20.0 | | | | | | |
| PINECRYSTAL KE604 | | | | 20.0 | | | | | |
| PINECRYSTAL KR614 | | | | | 20.0 | | | | |
| IRGACURE 907 | 3.0 | 3.0 | 3.0 | 3.0 | 3.0 | 3.0 | 3.0 | 3.0 | 3.0 |
| SP-13 | 0.04 | 0.04 | 0.04 | 0.04 | 0.04 | 0.04 | 0.04 | 0.04 | 0.04 |
| MEK | 40.9 | 40.9 | 40.9 | 40.9 | 40.9 | 40.9 | 40.9 | 40.9 | 40.9 |
| Methyl acetate | 40.9 | 40.9 | 40.9 | 40.9 | 40.9 | 40.9 | 40.9 | 40.9 | 40.9 |
| Total | 181.8 | 181.8 | 181.8 | 181.8 | 181.8 | 181.8 | 181.8 | 181.8 | 181.8 |

| Low moisture-permeable layer-forming composition | BL-10 | BL-11 | BL-12 | BL-13 | BL-14 | BL-15 | BL-16 | BL-17 |
|---|---|---|---|---|---|---|---|---|
| Alicyclic compound or fluorene compound (Details) | 51.0 | 77.0 | 77.0 | 77.0 | 67.0 | 97.0 | 42.0 | |
| A-DCP | | | 67.0 | | 67.0 | 97.0 | 42.0 | |
| DCP | 51.0 | | | 67.0 | | | | |
| AA-BPEF | | 77.0 | | | | | | |
| FA-513AS | | | 10.0 | | | | | |
| FA-513M | | | | 10.0 | | | | |
| PET30 | | | | | 10.0 | | | 77.0 |
| Unsaturated acid-modified rosin A | 46.0 | 20.0 | 20.0 | 20.0 | 20.0 | | 55.0 | 20.0 |
| Unsaturated acid-modified rosin compound B | | | | | | | | |
| Unsaturated acid-modified rosin compound C | | | | | | | | |
| PINECRYSTAL KE604 | | | | | | | | |
| PINECRYSTAL KR614 | | | | | | | | |
| IRGACURE 907 | 3.0 | 3.0 | 3.0 | 3.0 | 3.0 | 3.0 | 3.0 | 3.0 |
| SP-13 | 0.04 | 0.04 | 0.04 | 0.04 | 0.04 | 0.04 | 0.04 | 0.04 |
| MEK | 40.9 | 40.9 | 40.9 | 40.9 | 40.9 | 40.9 | 40.9 | 40.9 |
| Methyl acetate | 40.9 | 40.9 | 40.9 | 40.9 | 40.9 | 40.9 | 40.9 | 40.9 |
| Total | 181.8 | 181.8 | 181.8 | 181.8 | 181.8 | 181.8 | 181.8 | 181.8 |

<Manufacture of Optical Film 101>

As a base film, FUJITAC TD60 (having a width of 1,340 mm and a thickness of 60 μm, manufactured by Fujifilm Corporation) was unwound from a roll form, then coated with Low Moisture-Permeable Layer-Forming Composition BL-1 by a die coating method using the slot die described in Example 1 of Japanese Patent Application Laid-Open No. 2006-122889 under the condition of a conveying speed of 30 m/min, and dried at 60° C. for 150 seconds. Then, the coated layer was cured by irradiating with an ultraviolet ray at an illuminance of 400 mW/cm$^2$ and an irradiation dose of 120 mJ/cm$^2$ by an air-cooled metal halide lamp with an output of 160 W/cm (manufactured by Eye Graphics Co., Ltd.) at an oxygen concentration of about 0.1% while further purging in the presence of nitrogen, and was wound. The coated amount was adjusted such that the film thickness of the low moisture-permeable layer reaches 10 μm.

The obtained optical film was designated as Optical Film 101.

<Manufacture of Optical Film 102 to 117>

Except that a low moisture-permeable layer-forming composition used to prepare Optical Film 101 was prepared as described in Table 1, Optical Film 102 to 117 was manufactured in the same manner as Optical Film 101.

[Evaluation of Optical Film]

With respect to the manufactured optical film in each of the Examples and Comparative Examples, the film thickness was measured to measure and evaluate the following physical properties. The results are shown in Table 2 below.

(1) Moisture Permeability (a Moisture Permeability Under a Temperature of 40° C. And a Relative Humidity of 90%)

A 70 mmφ sample of the optical film in each of the Examples and Comparative Examples was humidity-conditioned at 40° C. and a relative humidity of 90% for 24 hours, and then measured by a method described in JIS Z-0208.

The moisture permeability of the base film of each optical film was measured to calculate the moisture permeability of the low moisture-permeable layer based on the moisture permeability of the optical film and the base film according to Formula (1) described herein.

(2) Evaluation of Adhesion

The surface of the optical film where the low moisture-permeable layer is provided was incised with a cutter knife to form 11 vertical lines and 11 horizontal lines in a grid pattern and thus define a total of 100 squares with a size of 1 cm×1 cm, and an adhesion test was performed by press-bonding a polyester adhesive tape "No. 31B" manufactured by Nitto Denko Corp. to observe the presence or absence of separation with eyes.

When the separation was present in less than 20 of the 100 squares, the adhesion test was repeated up to 2 times on the same site, and the presence or absence of separation was observed with eyes to perform a 5-step evaluation described below.

A: No separation was recognized in the 100 blocks during the two times of adhesion testing B: Separation was observed in 1 to 5 blocks of the 100 blocks during the two times of adhesion testing C: Separation was observed in 6 to 19 blocks of the 100 blocks during the two times of adhesion testing D: Separation was observed in more than 20 blocks of the 100 blocks during the two times of adhesion testing E: Separation was observed in more than 20 blocks of the 100 blocks during the one time of adhesion testing

[Evaluation of Panel]

<Manufacture of Polarizing Plate>

1) Saponification of Film

A commercially available cellulose acylate film (FUJI-TAC ZRD40 manufactured by Fujifilm Corporation), a commercially available cellulose acylate film TD60 (manufactured by Fujifilm Corporation), and an optical film (101 to 117) were immersed for 2 minutes in 1.5 mol/L of an NaOH solution (saponified solution) kept at 55° C., washed with water, immersed again for 30 seconds in 0.05 mol/L of an aqueous sulfuric acid solution having a temperature of 20° C., and was transitioned to a neutral state by passing the water bath under flowing water for 30 seconds. Then, dewatering was performed three times using an air knife to blow off water and drying was performed by keeping the film in a drying zone having a temperature of 70° C. for 15 seconds, thereby manufacturing a saponified film.

2) Manufacture of Polarizer

According to Example 1 described in Japanese Patent Application Laid-Open No. 2001-141926, iodine was absorbed onto a stretched polyvinyl alcohol film to thereby manufacture a polarizer having a film thickness of 20 µm.

3) Bonding (Manufacture of Front-Side Polarizing Plates 101 to 117)

The above-described saponified optical film (101 to 107) (arranged such that the surface of each optical film where a low moisture-permeable layer is not stacked is in contact with a polarizer), the polarizer manufactured as described above, the saponified cellulose acylate film ZRD40 were bonded via a PVA-based adhesive in the named order and then thermally dried to thereby manufacture Polarizing Plates 101-117.

In the arrangement, the manufactured roll of polarizer and the optical film (101 to 107) were configured to be parallel in their longitudinal direction. Further, the roll of polarizer and the roll of cellulose acylate film ZRD40 were configured to be parallel in their longitudinal direction.

(Manufacture of Front-Side Polarizing Plates 201, 202, 215 and 217)

To one surface of the polarizer manufactured as described above, the surface of the manufactured optical film (101, 102, 115 and 117), on which a low moisture-permeable layer is stacked, was bonded via an acrylic adhesive after corona treated. To the other surface of the polarizer manufactured as described above, the above-described saponified commercially available cellulose acylate film ZRD40 was bonded via a polyvinyl alcohol-based adhesive and dried for 10 minutes or more at 70° C. to thereby manufacture Polarizing Plates 201, 202, 215 and 217.

In the arrangement, the manufactured roll of polarizer and the optical film (101, 102, 115 and 117) were configured to be parallel in their longitudinal direction. Further, the roll of polarizer and the roll of cellulose acylate film ZRD40 were configured to be parallel in their longitudinal direction.

The obtained polarizing plates were designated as Polarizing Plates 201, 202, 215 and 217.

(Manufacture of Rear-Side Polarizing Plate)

The above-described saponified cellulose acylate film TD60, the obtained stretched iodine-based PVA polarizer, and the saponified cellulose acylate film ZRD40 were bonded via a PVA-based adhesive in the named order and then thermally dried to thereby obtain a rear-side polarizing plate.

In the arrangement, the manufactured roll of polarizer and the cellulose acylate film TD60 were configured to be parallel in their longitudinal direction. Further, the roll of polarizer and the roll of cellulose acylate film ZRD40 were configured to be parallel in their longitudinal direction.

<Mounting on IPS Panel>

From an IPS mode liquid crystal cell (42LS5600 manufactured by LGD), upper and lower polarizing plates were removed, and one sheet of the above-mentioned polarizing plate (101 to 117, 201, 202, 215 and 217) was bonded to the front side (viewing side) and one sheet of the same was bonded to the rear side respectively as a front-side polarizing plate and a rear-side polarizing plate via an adhesive such that the cellulose acylate film ZRD40 is on the liquid crystal cell side. These plates were arranged in a crossed-Nicol configuration such that the absorption axis of the front-side polarizing plate and the transmission axis of the rear-side polarizing plate extend in the longitudinal direction (right and left directions). The thickness of the glass used in the liquid crystal cell was 0.5 mm.

The obtained liquid crystal display device was designated as Liquid Crystal Display Device 101 to 117, 201, 202, 215 and 217.

Further, the configuration of the front-side polarizing plate when mounted on an IPS panel is described in Table 3 below.

The liquid crystal display device manufactured as described above was evaluated for light leakage. The results are listed in Table 3.

[Evaluation of Light Leakage (Evaluation of Panel)]

The liquid crystal display device 101 to 117, 201, 202, 215 and 217 manufactured as described above was thermally treated for 48 hours under the condition of a temperature of 60° C. and a relative humidity of 90%, left for 2 hours under the condition of a temperature of 25° C. and a relative humidity of 60%. Then, the backlight of the liquid crystal display device was turned on to evaluate light leakage at 4 corners of the panel after 5 hours and 10 hours from the time of lighting-up.

To evaluate the light leakage, a black display screen was captured from the front surface of the screen with ProMetric (manufactured by Radiant Imaging) and then a 7-step evaluation was performed based on the difference between the average brightness on the entire screen and the brightness in an area of the 4 corners where light leakage is large. In the present invention, the levels A and B are within the limit of allowance.

<Index of Evaluation>

A: After 5 hours, no light leakage was visibly recognized at the 4 corners of the panel.

After 10 hours, no light leakage was visibly recognized at the 4 corners of the panel.

B: After 5 hours, a little light leakage was visibly recognized at 1 to 2 of the 4 corners of the panel.

After 10 hours, no light leakage was visibly recognized at the 4 corners of the panel.

C: After 5 hours, a little light leakage was visibly recognized at 1 to 2 of the 4 corners of the panel.

After 10 hours, a light leakage was visibly recognized at 1 to 2 of the 4 corners of the panel.

D: After 5 hours, a little light leakage was visibly recognized at 3 to 4 of the 4 corners of the panel.

After 10 hours, a little light leakage was visibly recognized at 1 to 2 of the 4 corners of the panel.

E: After 5 hours, a little light leakage was visibly recognized at 3 to 4 of the 4 corners of the panel.
After 10 hours, a little light leakage was visibly recognized at 3 to 4 of the 4 corners of the panel.
F: After 5 hours, light leakage at the 4 corners of the panel was too strong to be permitted.
After 10 hours, a little light leakage was visibly recognized at 3 to 4 of the 4 corners of the panel.
G: After 5 hours, a strong light leakage was visibly recognized at the 4 corners of the panel.
After 10 hours, a strong light leakage was visibly recognized at the 4 corners of the panel.

From the results listed in Tables 2 and 3, the following is obviously understood.

1. There is a strong correlation between the moisture permeability of the optical film and the light leakage caused over time under a high-temperature high-humidity condition, and a lower moisture permeability is more effective in suppressing light leakage.

2. The optical film in Examples 101-114, wherein a predetermined amount of (A) at least one of a compound having a cycloaliphatic hydrocarbon group and an ethylenically unsaturated double bond and a compound having a fluorene ring and an ethylenically unsaturated double bond

TABLE 2

| | Optical film sample No. | | | | | | | | |
|---|---|---|---|---|---|---|---|---|---|
| | 101 Ex. | 102 Ex. | 103 Ex. | 104 Ex. | 105 Ex. | 106 Ex. | 107 Ex. | 108 Ex. | 109 Ex. |
| Low moisture-permeable layer-forming composition | BL-1 | BL-2 | BL-3 | BL-4 | BL-5 | BL-6 | BL-7 | BL-8 | BL-9 |
| Moisture permeability of low moisture-permeable layer (g/m$^2$/day/10 μm) | 78 | 80 | 82 | 81 | 83 | 75 | 90 | 90 | 100 |
| Moisture permeability of low moisture-permeable layer (g/m$^2$/day) | 78 | 80 | 82 | 81 | 83 | 75 | 90 | 90 | 100 |
| Moisture permeability of optical film (g/m$^2$/day) | 68 | 69 | 71 | 70 | 72 | 88 | 77 | 77 | 84 |
| Adhesion | A | A | B | B | C | A | B | A | A |

| | Optical film sample No. | | | | | | | |
|---|---|---|---|---|---|---|---|---|
| | 110 Ex. | 111 Ex. | 112 Ex. | 113 Ex. | 114 Ex. | 115 C. Ex. | 116 C. Ex. | 117 C. Ex. |
| Low moisture-permeable layer-forming composition | BL-10 | BL-11 | BL-12 | BL-13 | BL-14 | BL-15 | BL-16 | BL-17 |
| Moisture permeability of low moisture-permeable layer (g/m$^2$/day/10 μm) | 90 | 80 | 79 | 81 | 85 | 110 | 110 | 290 |
| Moisture permeability of low moisture-permeable layer (g/m$^2$/day) | 90 | 80 | 79 | 81 | 85 | 110 | 110 | 290 |
| Moisture permeability of optical film (g/m$^2$/day) | 77 | 69 | 69 | 70 | 73 | 91 | 91 | 186 |
| Adhesion | A | A | A | A | A | A | C | A |

TABLE 3

| Display device | Viewing side | Low moisture-permeable layer | Cell side | Panel evaluation | Remark |
|---|---|---|---|---|---|
| 101 | Film 101 | Viewing side | ZRD40 | A | Example |
| 102 | Film 102 | Viewing side | ZRD40 | A | Example |
| 103 | Film 103 | Viewing side | ZRD40 | A | Example |
| 104 | Film 104 | Viewing side | ZRD40 | A | Example |
| 105 | Film 105 | Viewing side | ZRD40 | A | Example |
| 106 | Film 106 | Viewing side | ZRD40 | A | Example |
| 107 | Film 107 | Viewing side | ZRD40 | A | Example |
| 108 | Film 108 | Viewing side | ZRD40 | A | Example |
| 109 | Film 109 | Viewing side | ZRD40 | B | Example |
| 110 | Film 110 | Viewing side | ZRD40 | A | Example |
| 111 | Film 111 | Viewing side | ZRD40 | A | Example |
| 112 | Film 112 | Viewing side | ZRD40 | A | Example |
| 113 | Film 113 | Viewing side | ZRD40 | A | Example |
| 114 | Film 114 | Viewing side | ZRD40 | A | Example |
| 115 | Film 115 | Viewing side | ZRD40 | C | Comp. Example |
| 116 | Film 116 | Viewing side | ZRD40 | C | Comp. Example |
| 117 | Film 117 | Viewing side | ZRD40 | F | Comp. Example |
| 201 | Film 101 | Polarizer side | ZRD40 | A | Example |
| 202 | Film 102 | Polarizer side | ZRD40 | A | Example |
| 215 | Film 115 | Polarizer side | ZRD40 | C | Comp. Example |
| 217 | Film 117 | Polarizer side | ZRD40 | F | Comp. Example | and a predetermined amount of (B) a rosin compound are applied in a low moisture-permeable layer, is preferred in terms of having a smaller film thickness while having a lower moisture permeability.

3. Of rosin compounds (B), an unsaturated acid-modified rosin is particularly preferred in terms of exhibiting excellent adhesion.

4. The results of an evaluation when the optical film of the present invention was mounted on a displayed device showed that the case where the surface opposite the low moisture-permeable layer was adhered to the polarizer and the case where the low moisture-permeability layer was adhered to the polarizing layer reached the same result as each other. The optical film of the present invention is able to be adhered on its both surfaces to the polarizer.

Subsequently, a hard coat layer was stacked on the optical film of the present invention.

Manufacture Example 3

[Preparation of Hard Coat Layer-Forming Composition]
This composition was prepared as follows.
(Composition of Hard Coat Layer-Forming Composition HC-1)

| PET30 | 97.0 parts by mass |
|---|---|
| Irgacure 907 | 3.0 parts by mass |

| | |
|---|---|
| SP-13 | 0.04 parts by mass |
| MEK | 81.8 parts by mass |

<Manufacture of Optical Film 301>

The roll-type optical film 101 manufactured as described above was unwound from the roll, and the surface where a low moisture-permeable layer was stacked was coated with Hard Coat Layer-Forming Composition HC-1 by a die coating method using the slot die described in Example 1 of Japanese Patent Application Laid-Open No. 2006-122889 under the condition of a conveying speed of 30 m/min and dried at 60° C. for 150 seconds. Then, the coated layer was cured by irradiating with an ultraviolet ray at an illuminance of 400 mW/cm$^2$ and an irradiation dose of 300 mJ/cm$^2$ by using an air-cooled metal halide lamp with an output of 160 W/cm (manufactured by Eye Graphics Co., Ltd.) at an oxygen concentration of about 0.1 vol. % while further purging in the presence of nitrogen, and was wound. The coated amount was adjusted such that the film thickness of the hard coat layer reaches 8 μm.

The obtained film was designated as Optical Film 301 of the Example.

<Manufacture of Optical Film 317>

Except that the optical film 101 was changed to the optical film 117, an optical film 317 in the Comparative Examples was manufactured in the same manner as in the optical film 301.

<Manufacture of Optical Film 320>

Except that the optical film was changed to Fujitac TD60 (having a width of 1,340 mm and a thickness of 60 μm, manufactured by Fujifilm Corporation), an optical film 320 in a Comparative Example was manufactured in the same manner as in the optical film 301.

<Manufacture of Optical Film 401>

The roll-type optical film 101 manufactured as described above was unwound from the roll, and the surface where a low moisture-permeable layer was stacked was coated with Hard Coat Layer-Forming Composition HC-1 by a die coating method using the slot die described in Example 1 of Japanese Patent Application Laid-Open No. 2006-122889 under the condition of a conveying speed of 30 m/min and dried at 60° C. for 150 seconds. Then, the coated layer was cured by irradiating with an ultraviolet ray at an illuminance of 400 mW/cm$^2$ and an irradiation dose of 300 mJ/cm$^2$ by using an air-cooled metal halide lamp with an output of 160 W/cm (manufactured by Eye Graphics Co., Ltd.) at an oxygen concentration of about 0.1 vol % while further purging in the presence of nitrogen, and was wound. The coated amount was adjusted such that the film thickness of the hard coat layer reaches 8 μm.

The obtained film was designated as Optical Film 4 of the Example.

[Evaluation of Optical Film]

For the manufactured optical film in each Example and Comparative Example, the film thickness was measured to measure and evaluate the properties below. The results are listed in Table 4 below.

The film thickness of the hard coat layer in the optical film was calculated by measuring the film thickness before and after the stacking of the hard coat layer and calculating the difference in the film thickness. The film thickness of the low moisture-permeable layer in the optical film was calculated by measuring the film thickness before and after the stacking of the low moisture-permeable layer and calculating the difference in the film thickness.

(Moisture Permeability)

The moisture permeability was measured by a method defined in JIS Z-0208, in the same manner as in the optical film 101.

(Pencil Hardness Evaluation)

As an index of scratch resistance, the pencil hardness described in JIS K-5400 was evaluated. The optical film was humidity-conditioned at a temperature of 25° C. and a humidity of 60% RH for 2 hours, and then the surface where the hard coat layer was stacked was evaluated under a load of 4.9 N by using 2H to 5H test pencils specified in JIS S-6006 according to the following criteria, and the highest pencil hardness indicated by OK was used as the evaluation value.

OK: 3 or more of no scratch in evaluation of n=5
NG: 2 or less of no scratch in evaluation of n=5

[Evaluation of Panel]

<Manufacture of Polarizing Plate>

1) Saponification of Film

A commercially available cellulose acylate film (FUJI-TAC ZRD40 manufactured by Fujifilm Corporation), a commercially available cellulose acylate film TD60 (manufactured by Fujifilm Corporation), and an optical film (301, 317, 320) were immersed for 2 minutes in 1.5 molIL of an NaOH solution (saponified solution) kept at 55° C., washed with water, immersed again for 30 seconds in 0.05 mol/L of an aqueous sulfuric acid solution having a temperature of 25° C., and was transitioned to a neutral state by passing the water bath under flowing water for 30 seconds. Then, dewatering was performed three times using an air knife to blow off water and drying was performed by keeping the film in a drying zone having a temperature of 70° C. for 15 seconds, thereby manufacturing a saponified film.

2) Manufacture of Polarizer

According to Example 1 described in Japanese Patent Application Laid-Open No. 2001-141926, iodine was absorbed onto a stretched polyvinyl alcohol film to thereby manufacture a polarizer having a film thickness of 20 μm.

3) Bonding (Manufacture of Front-Side Polarizing Plates 301, 317, 320)

The above-described saponified optical film (301, 317, 320) (arranged such that the surface of each optical film where a low moisture-permeable layer is not stacked is in contact with a polarizer), the polarizer manufactured as described above, the saponified cellulose acylate film ZRD40 were bonded via a PVA-based adhesive in the named order and then thermally dried to thereby manufacture Polarizing Plates 301, 317 and 320.

(Manufacture of Front-Side Polarizing Plate 401)

To one surface of the polarizer manufactured as described above, the surface of the manufactured optical film 401, on which a low moisture-permeable layer is stacked, was bonded via an acrylic adhesive after corona treated. To the other surface of the polarizer manufactured as described above, the above-described saponified commercially available cellulose acylate film ZRD40 was bonded via a polyvinyl alcohol-based adhesive and dried for 10 minutes or more at 70° C. to thereby manufacture Polarizing Plate 401.

<Mounting on IPS Panel>

Except that a front-side polarizing plate used in the liquid crystal display device 101 was changed from the polarizing plate 101 to the polarizing plate 301, 317, 320 and 401, the liquid crystal display device 301, 317, 320 and 401 were manufactured in the same manner as in the liquid crystal display device 101.

The liquid crystal display device manufactured as described above was evaluated for light leakage. The results are described in Table 4.

TABLE 4

| Hard coat film (optical film) No. | Configuration of hard coat film ||||| HC film evaluation ||||
|---|---|---|---|---|---|---|---|---|
| | Optical film ||| HC layer || Film thickness (μm) | Moisture permeability (g/m²/day) | Panel Evaluation | Pencil hardness | Remark |
| | Base name | Moisture permeability (g/m²/day) | Kind | Stacked layers | | | | | |
| 301 | Optical film 101 | 68 | HC-1 | Low moisture permeable layer | 8 | 60 | A | 3 H | Example |
| 317 | Optical film 117 | 186 | HC-1 | Low moisture permeable layer | 8 | 137 | E | 3 H | Comparative Example |
| 320 | TD60 | 520 | HC-1 | Base film | 8 | 261 | G | 3 H | Comparative Example |
| 401 | Optical film 101 | 68 | HC-1 | Base film | 8 | 60 | A | 3 H | Example |

\* The configuration of each optical film is as follows. Optical Film 301, 307 Base film/Low Moisture-Permeable Layer/Hard Coat Layer Optical Film 320 Base film/Hard Coat Layer Optical Film 401 Low Moisture-Permeable Layer/Base film/Hard Coat Layer From the results listed in Table 4, the following is obviously seen.

1. By stacking a hard coat layer on the optical film of the present invention, it is possible to impart a higher pencil hardness (3H) in addition to the low moisture permeability.
2. Both of a case where the hard coat layer is stacked on the low moisture-permeable layer (optical film 301) and a case where the hard coat layer and the low moisture-permeable layer were disposed on the opposite surfaces of the base film (optical film 401) have sound pencil hardness and moisture permeability.

Manufacturing Example 4

Subsequently, an embodiment of the present invention, which has an optically anisotrpohic layer with a pattern will be described below.

(Saponfication of One Surface of Optical Film)

The optical film 301 manufactured as described above was passed through a dielectric heating roll having a temperature of 60° C. to elevate the film surface temperature to 40° C. Then, its surface opposite the surface where a hard coat layer was formed was coated continuously with an alkali solution having a composition described below by using a #6 wire bar, heated to 110° C. and conveyed for 10 seconds under a steam infrared heater manufactured by Noritake Co., Ltd. Thereafter, pure water 3 ml/m² was similarly applied by using a bar coater. Then, after water washing by a fountain coater and dewatering by an air knife were repeated three times, the film was conveyed to a drying zone under a temperature of 70° C. and dried for 10 seconds, thereby saponifying one surface of the optical film 301.

| Composition of Alkali Solution | |
|---|---|
| Potassium Hydroxide | 2.0 parts by mass |
| Water | 6.5 parts by mass |
| Isopropanol | 85.0 parts by mass |
| Surfactant SF-1: $C_{14}H_{29}O(CH_2CH_2O)_{20}H$ | 0.035 parts by mass |
| Propyleneglycol | 6.5 parts by mass |

[Manufacture of Optical Film 3011 Having Alignment Film Before Exposure]

The saponified surface of the alkali saponified optical film 301 was continuously coated with an alignment film-forming coating liquid 1 having a composition described below by using a #14 wire bar, then was dried for 60 seconds in a 60° C. hot air and further for 120 seconds in a 100° C. hot air to thereby form an optical film 3011 having an alignment film before exposure. The film thickness of the alignment film before exposure was 0.45 μm and the oxygen permeability was 132 cc/[m²·day·atom].

| Composition of Alignment Film-Forming Coating Liquid 1 | |
|---|---|
| Polymer material for the alignment film below (P-1) (Weight average molecular rate (Mw): 20,000; the composition ratio of the repeating unit in the formula below is a mass ratio) | 2.4 parts by mass |
| Photogenerator below (S-1) | 0.17 parts by mass |
| Radical polymerization initiator (Irgacure 2959 manufactured by BASF) | 0.18 parts by mass |
| Methanol | 16.5 parts by mass |
| IPA(isopropanol) | 7.2 parts by mass |
| Water | 73.55 parts by mass |

[Chem. 15]

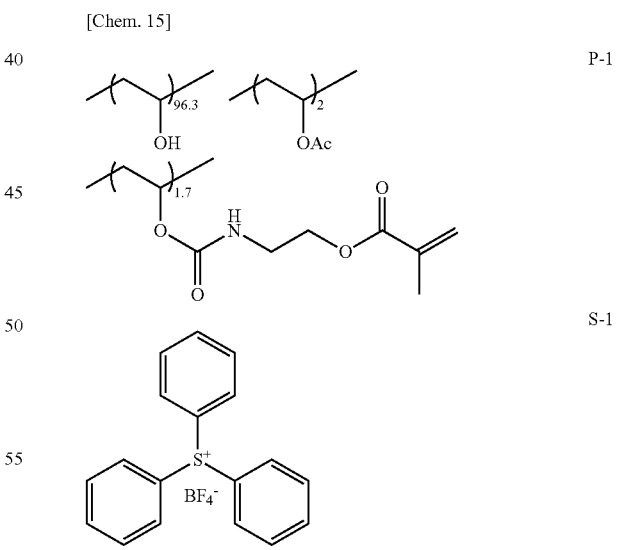

P-1

S-1

(Exposure to UV light)

Subsequently, a stripe mask having a horizontal stripe width of 363 μm in a transmitting part and a horizontal stripe width of 363 μm in a shielding part was disposed on the above-manufactured optical film 3011, and was irradiated with a UV beam for 0.06 seconds (30 mJ/cm²) under an atmosphere of room temperature atmosphere (25° C.) by using a UV irradiating device having an illuminance of 500 mW/cm² at a wavelength range of from 200 nm to 400 nm (Light Hammer 10, 240 W/cm, manufactured by Fusion UV System) as a light source unit, thereby forming a pattern alignment film.

[Formation of Optically Anisotropic Pattern Layer]

The pattern alignment film after exposure to UV light was rubbed by stroking one time in one direction at 500 rpm at an angle of 45 relative to the stripes of the stripe mask. Then, the coating liquid for an optically anisotropic layer as listed below was applied by using a wire bar in a controlled manner such that the film thickness reaches 1.2 μm after curing. Further, the coated layer was heated and aged for 2 minutes at a film surface temperature of 110° C., cooled to 80° C., and then irradiated with UV light using an air-cooled metal halide lamp of 20 mW/cm² in the presence of air to fix its alignment status, thereby forming an optically anisotropic pattern layer. In the mask exposure portion (first phase retardation region), a discotic liquid crystalline compound was vertically aligned such that the fast axis direction is parallel to the rubbing direction, and in the non-exposure portion (second phase retardation) was orthogonal vertically aligned.

| Composition of Optically Anisotropic Layer Coating Liquid | |
|---|---|
| Discotic liquid crystalline compound E-2 | 100 parts by mass |
| Alignment film interface alignment agent (II-1) | 1.0 parts by mass |
| Air interface alignment agent (P-2) | 0.4 parts by mass |
| Photopolymerization Initiator (Irgacure 907 manufactured by BASF) | 3.0 parts by mass |
| Sensitizing Agent (Kayacure DETX manufactured by Nippon Kayaku Co., Ltd.) | 1.0 parts by pass |
| Methylethyl ketone | 400 parts by mass |

[Chem. 16]
Discotic liquid crystalline compound E-2

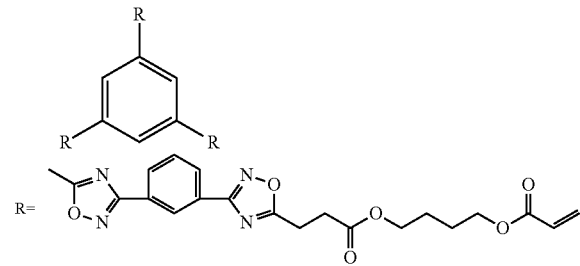

Alignment film interface alignment agent (II-1)

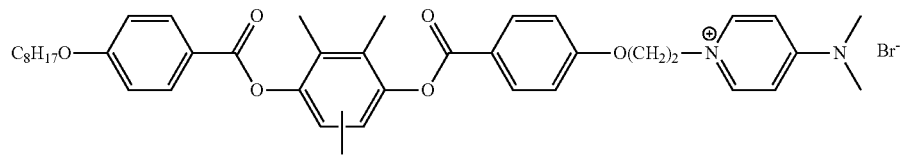

Air interface alignment agent (P-2)

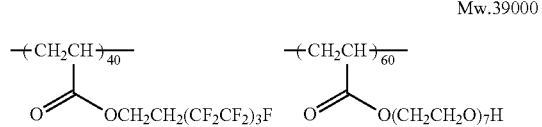

The ratio of 40:60 in the formula of the air interface alignment agent P-2 represents a molar ratio.

(Manufacture of Optical Film 501)

As described above, an optical film 501 of the present invention was manufactured, wherein a base film is provided on its both surfaces with a hard coat layer and an optically anisotropic pattern layer.

(Manufacture of Sample of Comparative Examples)

Except that the optical film 301 was changed to the optical film 320 on which the low moisture-permeable layer of the present invention was not stacked, the optical film 502 in the Comparative Examples, where both surfaces of a support were provided with a hard coat layer and a pattern optically anisotropic layer, was manufactured in the same manner as in the optical film 501.

(Manufacture of Front-Side Polarizing Plate 501)

Like in the front-side polarizing plate 401, after a polarizer and a saponified cellulose acylate film ZRD40 were adhered by a PVA-based adhesive, the surface of the optical film 501 on which an optically anisotropic pattern layer was formed was adhered via an acrylic adhesive to one surface of the polarizer, thereby manufacturing a front-side polarizing plate 501.

(Manufacture of Front-Side Polarizing Plate 502)

Except that the optical film 501 was replaced by the optical film 502, a front-side polarizing plate 502 was manufactured in the same manner.

<Mounting on IPS Panel>

Except that a front-side polarizing plate in the liquid crystal display device 101 was changed from the polarizing plate 101 to the polarizing plate 501, 502, the liquid crystal display device 501, 502 was manufactured in the same manner.

In the liquid crystal display devices manufactured as described above, light leakage was evaluated using the same method as in the liquid crystal display device 101.

The liquid crystal display device 501 was A, and the liquid crystal display device 502 was G. Thus, it was known that an embodiment including an optically anisotropic layer forming a pattern is preferred because it was also able to prevent light leakage.

Manufacture Example 5

In the following, an embodiment of the present invention that includes an optically anisotropic layer forming a pattern having a photoradical curing-based alignment film will be described.

Reference was made to the Examples described in Japanese National Publication of International Patent Application No. 2012-517024 (WO2010/090429). On the surface of the optical film 301, on which the hard coat layer was not stacked, a polynorbornene-containing alignment film having a dried thickness of 1000 Å (angstrom) was formed.

Referring to paragraph [0193] of U.S. Patent Application Publication No. 2012/0076954, a polymerization reaction of 5-norbornene-2-methyl-(4-methoxycinnamate) was performed to thereby obtain polynorbornene having a cinnamate group represented by following Formula 1 (weight average molecular weight (Mw)=150,000).

[Chem. 17]

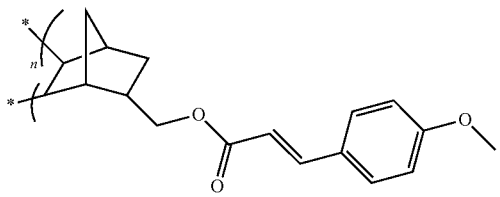

(Composition of Polynorbornene-Containing Alignment Film Composition)

| | |
|---|---|
| Polynorbornene having a cinnamate group represented by Formula 1 | 20.0 parts by mass |
| Pentaerythritoltriacrylate | 10.0 parts by mass |
| Irgacure 907 | 5.0 parts by mass |
| Cyclohexanon | 980.0 parts by mass |

By using the above-described polynorbornene-containing alignment film composition and referring to the Examples described in Japanese National Publication of International Patent Application No. 2012-517024 (WO2010/090429), a polynorbornen-containing alignment film having a dried thickness of 1000 Å was formed on the surface of the film manufactured as described above, on which a hard coat layer was not stacked.

Thereafter, on the top of the polynorbornene-containing film, a pattern mask (100 mm×100 mm), in which a pattern of a light transmissive region having a width of 500 μm and a pattern of a light shielding region are arranged alternately in the vertical and horizontal direction.

Then, on the top of the pattern mask, a UV polarizing plate having two different regions through which different polarized light beams are transmitted was arranged in parallel to the extending direction of the film. Then, UV light having a strength of 300 mW/cm$^2$ from the top of the UV polarizing plate continuously irradiated the substrate for 30 seconds while moving the substrate in the film extending direction at a speed of 3 m/minute, thereby obtaining an alignment film wherein a first alignment region and a second alignment region, whose polymer was aligned in a different direction from each other by a predetermined region of the polynorbornene-containing alignment film, are alternately arranged along the longitudinal length of the polymer film.

On the alignment film, LC242™ manufactured by BASF was applied as a liquid crystal material such that the dried thickness reaches approximately 1 μm, and irradiated with UV light having a strength of 300 mW/cm$^2$ for 10 seconds to cure the liquid crystal, thereby forming a phase retardation layer. As a liquid crystal material, a reactive mesogen (RM)-based material manufactured by Mark may be used. Since the phase retardation layer is formed on an alignment film whose polymer is aligned in different alignment directions by micro regions, it was aligned such that an optic axis of an optically anisotropic material is different per micro region, thereby obtaining an optical film for a stereoscopic image display device (optical film 511).

(Manufacture of Optical Film 512)

Except that the optical film 301 was replaced by the optical film 401 and the alignment film was stacked on the low moisture-permeable layer, an optical film 512 was manufactured in the same manner as in the optical film 511.

(Manufacture of Optical Film 513)

Except that the optical film 301 was replaced by the optical film 320, an optical film 513 was manufactured in the same manner as in the optical film 511.

In the optical film 511, 512, 513 manufactured by this method, light transmitted through an optical filter (optical film), which is aligned and fixed such that the liquid crystal has a different optical axis per micro region, is controlled such that the polarizing direction of the light varies by such a polarizing filter pass region. Thus, an image for a left eye and an image for a right eye discharged with different polarizing properties through the polarizing filter are projected through polarizing glasses, so that a 3-dimensional effect can be recognized in a polarizing glass mode.

(Manufacture of Front-Side Polarizing Plate 511, 512, 513)

Except that an optical film was replaced by the optical film 511, 512, 513, a front-side polarizing plate 511, 512, 513 was manufactured in the same manner as in the front-side polarizing plate 501.

<Mounting on IPS Panel>

Except that the polarizing plate 101 was replaced by the polarizing plate 511, 512 and 513, a liquid crystal display device 511, 512, 513 was manufactured in the same manner as in the above-described liquid crystal display device 101.

In the liquid crystal display devices manufactured as described above, light leakage was evaluated using the same method as in the liquid crystal display device 101.

The liquid crystal display device 511 and 512 was A, and the liquid crystal display device 513 was G. Thus, it was known that an embodiment including an optically anisotropic layer forming a pattern is preferred because it was also able to prevent light leakage.

Manufacturing Example 6

Subsequently, an example that uses an acrylic film as a base film will be described.

<Manufacture of Base Film A-1>

In a 30-L reaction vessel equipped with a stirrer, a temperature sensor, a condenser tube, and a nitrogen intake tube, 8,000 g of methylmethacrylate (MMA), 2,000 g of methyl 2-(hydroxymethyl)acrylate (MHMA), and, as a polymerization solvent, 10,000 g of toluene were introduced. The temperature of the content was elevated to 105° C. while being supplied with nitrogen. When a reflux started as a result of elevating the temperature, 10.0 g of t-amyl peroxy isononanoate was added as a polymerization initiator, and at the same time, a solution of 20.0 g of t-amyl peroxy isononanoate and 100 g of toluene was added dropwise over 2 hours to allow solution polymerization to progress under a reflux having a temperature of approximately 105 to 110° C., further followed by 4 hours of aging. The polymerization reactivity was 96.6%, and the MHMA content (weight percent) in the resulting polymer was 20.0%.

Next, 10 g of a stearyl phosphate/distearyl phosphate mixture (Phoslex A-18 manufactured by Sakai Chemical Industry Co., Ltd) was added as a cyclization catalyst to the obtained polymer solution to perform ring condensation for 5 hours under a reflux having a temperature of approximately 80 to 100° C.

The obtained polymer solution was introduced into a vent-type twin screw extruder (φ=29.75 mm; L/D=30) equipped with 1 rear vent and 4 fore vents at a processing rate of 2.0 kg/hour in terms of the amount of resin, wherein the extruder had a barrel temperature of 250° C., a revolution rate of 100 rpm and a reduced pressure level of 13.3 to 400 hPa (10 to 300 mmHg). Then, ring condensation and devolatilization were carried out in the extruder. After devolatilization, the thermally molten resin remaining in the extruder was discharged through a distal end of the extruder and pelletized by a pelletizer to thereby obtain a transparent pellet consisting of an acrylic resin having a lactone ring structure in its main chain. The resin had a weight-average molecular weight of 148,000, a melt flow rate of 11.0 g/10 min. (measured according to JIS K7120, wherein under the test temperature was 240° C. and the test load 10 kg; the same conditions will be also applied in the Manufacturing Examples described hereinafter), and a glass transition temperature of 130° C.

Then, the obtained pellet and the AS resin (Trade Name: TOYO AS AS20, manufactured by TOYO STYRENE Co., Ltd.) were subjected to kneading by using a short extruder (φ=30 mm) at the pellet/AS resin ratio of 90/10 to thereby result in a transparent pellet having a glass transition temperature of 127° C.

The above-manufactured pellet having a resin composition was melted and extruded from a coat hanger type T die by using a twin screw extruder to thereby manufacture a resin film having a thickness of approximately 160 μm.

Then, the obtained unstretched resin film was biaxially stretched 2.0 times in the vertical direction and 2.0 times in the horizontal direction simultaneously, thereby manufacturing a transparent plastic film substrate (base film A-1). The obtained biaxially stretched film has a thickness of 40 μm, a total light transmissivity of 92%, a haze of 0.3% and a glass transition temperature of 127° C.

<Manufacture of Base Film A-2>

In a 30-L reaction vessel equipped with a stirrer, a temperature sensor, a condenser tube, and a nitrogen intake tube, 41.5 parts by mass of methyl methacrylate (MMA), 6 parts by mass of methyl 2-(hydroxymethyl)acrylate (MHMA), 2.5 parts by mass of 2-(2'-hydroxy-5'-methacryloyloxy)ethylphenyl)-2H-benzotriazole (Trade Name: RUVA-93, manufactured by Otsuka Chemical Co., Ltd.), 50 parts by mass of toluene as a polymerization solvent, 0.025 parts by mass of an antioxidant (ADEKA STAB 2112, manufactured by Asahi Denka Kogyo K.K.), and 0.025 parts of n-dodecyl mercaptan as a chain transfer agent were introduced. Then, the temperature of the mixture was elevated to 105° C. while being supplied with nitrogen. When a reflux started as a result of elevating the temperature, 0.05 parts by mass of t-amylperoxyisononanoate (Trade Name: Luperox 570, manufactured by Arkema Yoshitomi, Ltd.) was added as a polymerization initiator and simultaneously 0.10 parts by mass of t-amylperoxyisononanoate was added dropwise over 3 hours to allow solution polymerization to progress under a reflux having a temperature of approximately 105 to 110° C., further followed by 4 hours of aging.

Next, to the obtained polymer solution, 0.05 parts by mass of 2-ethylhexyl phosphate (Phoslex A-8, manufactured by Sakai Chemical Industry Co., Ltd.) was added as a catalyst (cyclization catalyst) for cyclocondensation. Then, under a reflux having a temperature of approximately 90 to 110° C., the mixture was subjected to a ring condensation reaction for 2 hours. The resulting polymer solution was heated in an autoclave at 240° C. for 30 minutes and was further subjected to a ring condensation reaction. Next, 0.94 parts by mass of CGL 777MPA (manufactured by CIBA SPECIALTY CHEMICALS) as a UV absorber was added to the polymer solution after the reaction.

Next, the obtained polymer solution was introduced into a vent type twin-screw extruder (Φ=50.0 mm, L/D=30) equipped with 1 rear vent and 4 fore vents (the first, second, third, and fourth vents from the upstream side) and equipped at its rear end with a leaf disk-type polymer filter (with a filtration accuracy of 5 μm and a filtration area of 1.5 m²) at a processing rate of 45 kg/h in terms of the amount of resin, wherein the extruder has a barrel temperature of 240° C., a revolution rate of 100 rpm, and a reduced pressure level of 13.3 to 400 hPa (10 to 300 mmHg) to perforin degas. During this process, a separately prepared mixed solution of an antioxidant/cyclization catalyst deactivator was added at a rate of 0.68 kg/h on the downstream side of the first vent, and ion-exchanged water was added at a rate of 0.22 kg/h on the downstream side of the third vent.

As the mixed solution of the antioxidant/cyclization catalyst deactivator, a solution in which 50 parts by mass of an antioxidant (SUMILIZER GS manufactured by Sumitomo Chemical Co., Ltd.) and 35 parts by mass of zinc octylate (NIKKA OCTHIX 3.6% manufactured by NIHON KAGAKU SANGYO CO., LTD.) were dissolved in 200 parts by mass of toluene, was used.

Next, after the devolatilization was completed, the thermally molten resin that remained in the extruder was extruded from a distal end of the extruder while simultaneously filtered by a polymer filter and then pelletized by a pelletizer. Thus, an acrylic resin having a lactone ring structure in its main chain and a pellet having a transparent resin composition having a UV absorber were obtained. The weight average molecular weight of the resin was 145,000 and the glass transition temperature Tg of the resin and the resin composition was 122° C.

The above-manufactured pellet having a resin composition was melted and extruded from a coat hanger type T-die to thereby manufacture a resin film having a thickness of approximately 160 μm.

Next, the obtained unstretched resin film was stretched biaxially 2.0 times in the vertical direction and 2.0 times in the horizontal direction simultaneously to thereby manufacture a transparent plastic film substrate (base film A-2).

Upon measuring its physical properties, the resulting biaxially stretchable resin film has a thickness of 40 μm, a haze of 0.3%, a glass transition temperature of 128° C., a light transmittance of 5.8% at a wavelength of 380 nm, and a light transmittance of 92.2% at a wavelength of 500 nm.

(Composition of Low Moisture-Permeable Layer-Forming Composition BL-21)

| | |
|---|---|
| A-DCP | 77.0 parts by mass |
| Unsaturated Acid-Modified Rosin A (Acid Number: 342 mgKOH/g) | 20.0 parts by mass |
| Irgacure 907 | 3.0 parts by mass |
| SP-13 | 0.04 parts by mass |
| MEK | 82.0 parts by mass |

The solid concentration of Low Moisture-Permeable Layer-Forming Composition BL-21 was 55% by mass.

(Composition of Low Moisture-Permeable Layer-Forming Composition BL-22)

| | |
|---|---|
| A-DCP | 97.0 parts by mass |
| Irgacure 907 | 3.0 parts by mass |
| SP-13 | 0.04 parts by mass |
| MEK | 82.0 parts by mass |

The solid concentration of Low Moisture-Permeable Layer-Forming Composition BL-22 was 55% by mass.

<Manufacture of Optical Film 601>

The base film A-1 was unwound from a roll form, then coated with Low Moisture-Permeable Layer-Forming Composition BL-21 by a die coating method using the slot die described in Example 1 described in Japanese Patent Application Laid-Open No. 2006-122889 at a conveying speed of 30 m/min, and dried at 60° C. for 150 seconds. Then, the coated layer was cured by irradiating with an ultraviolet ray at an illuminance of 400 mW/cm² and an irradiation dose of 120 mJ/cm² by using an air-cooled metal halide lamp with an output of 160 W/cm (manufactured by Eye Graphics Co., Ltd.) at an oxygen concentration of about 0.1% while further purging in the presence of nitrogen, and was wound. The coated amount was adjusted such that the film thickness of the low moisture-permeable layer reaches 10 μm.

The obtained optical film was designated as Optical Film 601.

<Manufacture of Optical Film 602-604>

Except that the base film and the low moisture-permeable layer-forming composition were changed as described in the table below, an optical film 602 to 604 was manufactured in the same manner as in the optical film 601.

The moisture permeability of the optical film 601 to 604 manufactured as described above was evaluated in the same method as in the optical film 101. The results are listed in the table.

TABLE 5

| | Optical film sample No. | | | |
|---|---|---|---|---|
| | 601 Ex. | 602 C. Ex. | 603 Ex. | 604 C. Ex. |
| Low moisture-permeable layer-forming composition | BL-21 | BL-22 | BL-21 | BL-22 |
| Base film | A-1 | A-1 | A-2 | A-2 |
| Moisture permeability of low moisture-permeable layer (g/m²/day/10 μm) | 78 | 110 | 78 | 110 |
| Moisture permeability of low moisture-permeable layer (g/m²/day) | 78 | 110 | 78 | 110 |
| Moisture permeability of optical film (g/m²/day) | 39 | 46 | 40 | 47 |

From the results listed in Table 5, the following is clearly seen.

Like in a case where cellulose acylate is used as a base film, it is also a preferred embodiment that an acrylic film is used as a base film because the optical film that has a low moisture-permeable layer having a predetermined amount of (A) at least one of a compound having a cycloaliphatic hydrocarbon group and an ethylenically unsaturated double bond and a compound having a fluorene ring and an ethylenically unsaturated double bond and a predetermined amount of (B) a rosin compound has a lower moisture permeability than an optical film that does not.

Manufacturing Example 7

Next, an Example that a cellulose acylate film on which an adhesion layer is stacked is used as a base film will be described.

<Base film B-1: Manufacturing of Cellulose Acylate Film Having Adhesion Layer>

(Composition of Adhesion Layer-Forming Coating Liquid AL-1)

| A-TMMT | 3.39 parts by mass |
|---|---|
| Irgacure 907 | 0.11 parts by mass |
| SP-13 | 0.0007 parts by mass |
| MEK | 18.17 parts by mass |
| MIBK | 77.20 parts by mass |

The materials used will be listed below. (The materials used above are not listed.)

A-TMMT: Pentaerythritoltetraacrylate [manufactured by Shin-Nakamura Chemical Co., Ltd.]

FUJITAC TD60 (having a width of 1,340 mm and a thickness of 60 μm, manufactured by Fujifilm Corporation) was unwound from a roll form, then coated with the adhesion layer forming-composition AL-1 by a die coating method using the slot die described in Example 1 described in Japanese Patent Application Laid-Open No. 2006-122889 at a conveying speed of 30 m/min, and dried at 60° C. for 150 seconds. Then, the coated layer was cured by irradiating with an ultraviolet ray at an illuminance of 400 mW/cm² and an irradiation dose of 60 mJ/cm² by using an air-cooled metal halide lamp with an output of 160 W/cm (manufactured by Eye Graphics Co., Ltd.) at an oxygen concentration of about 0.1% while further purging in the presence of nitrogen, and was wound. The coated amount was adjusted such that the film thickness of the adhesion layer reaches 0.3 μm.

The obtained optical film was designated as base film B-1.

(Composition of Low Moisture-Permeable Layer-Forming Composition BL-23)

| A-DCP | 38.5 parts by mass |
|---|---|
| DCP | 38.5 parts by mass |
| Unsaturated acid-modified rosin A (Acid Number: 342 mgKOH/g) | 20.0 parts by mass |
| Irgacure 907 | 3.0 parts by mass |
| SP-13 | 0.04 parts by mass |
| MEK | 82.0 parts by mass |

The solid concentration of Low Moisture-Permeable Layer-Forming Composition BL-23 was 55% by mass.

(Composition of Low Moisture-Permeable Layer-Forming Composition BL-24)

| A-DCP | 43.5 parts by mass |
|---|---|
| DCP | 43.5 parts by mass |
| Hydrogenated Rosin D (Acid Number: 176 mgKOH/g) | 10.0 parts by mass |
| Irgacure 907 | 3.0 parts by mass |
| SP-13 | 0.04 parts by mass |
| MEK | 82.0 parts by mass |

The solid concentration of Low Moisture-Permeable Layer-Forming Composition BL-24 was 55% by mass.

(Composition of Low Moisture-Permeable Layer-Forming Composition BL-25)

| A-DCP | 46.0 parts by mass |
|---|---|
| DCP | 46.0 parts by mass |
| PINECRYSTAL KR614 | 15.0 parts by mass |
| Irgacure 907 | 3.0 parts by mass |
| SP-13 | 0.04 parts by mass |
| MEK | 82.0 parts by mass |

The solid concentration of Low Moisture-Permeable Layer-Forming Composition BL-25 was 55% by mass.

<Manufacture of Optical Film 701>

The base film B-1 was unwound from a roll form, then the surface on which an adhesion layer was stacked was coated with the low moisture-permeable layer-forming composition BL-21 by a die coating method using the slot die described in Example 1 described in Japanese Patent Application Laid-Open No. 2006-122889 at a conveying speed of 30 m/min, and dried at 60° C. for 150 seconds. Then, the coated layer was cured by irradiating with an ultraviolet ray at an illuminance of 400 mW/cm² and an irradiation dose of 120 mJ/cm² by using an air-cooled metal halide lamp with an output of 160 W/cm (manufactured by Eye Graphics Co., Ltd.) at an oxygen concentration of about 0.1% while further purging in the presence of nitrogen, and was wound. The coated amount was adjusted such that the film thickness of the low moisture-permeable layer reaches 9 μm.

The obtained optical film was designated as Optical Film 701.

<Manufacturing of Optical Film 702 to 705>

Except that the low moisture-permeable layer-forming composition BL-21 used to manufacture the optical film 701 was replaced by the optical film BL-22 to BL-25, an optical film 702 to 705 was manufactured in the same manner as in the optical film 701.

The moisture permeability of the optical film 701 to 705 manufactured as described above was evaluated by the same method as in the optical film 101. The results are listed in the table.

TABLE 6

| | Optical film sample No. | | | | |
|---|---|---|---|---|---|
| | 701 Ex. | 702 C. Ex. | 703 Ex. | 704 Ex. | 705 Ex. |
| Low moisture-permeable layer-forming composition | BL-21 | BL-22 | BL-23 | BL-24 | BL-25 |
| Base film | B-1 | B-1 | B-1 | B-1 | B-1 |
| Moisture permeability of low moisture-permeable layer (g/m²/day/10 μm) | 75 | 110 | 75 | 76 | 76 |
| Moisture permeability of low moisture-permeable layer (g/m²/day) | 83 | 122 | 83 | 84 | 84 |
| Moisture permeability of optical film (g/m²/day) | 72 | 99 | 72 | 73 | 73 |

From the results listed in Table 6, the following is clearly seen.

Like in a case where cellulose acylate having no adhesion layer is used as a base film, it is also a preferred embodiment that a cellulose acylate film on which an adhesion layer is stacked is used as a base film because the optical film that has a low moisture-permeable layer having a predetermined amount of (A) at least one of a compound having a cycloaliphatic hydrocarbon group and an ethylenically unsaturated double bond and a compound having a fluorene ring and an ethylenically unsaturated double bond and a predetermined amount of (B) a rosin compound has a lower moisture permeability than an optical film that does not.

Manufacturing Example 8

In the following, an optical film obtained by stacking an antiglare layer on the optical film of the present invention in Manufacturing Example 7 will be described.

[Preparation of Antiglare Layer-Forming Composition]

This composition was prepared as described below.

(Composition of Antiglare Hard Coat Layer-Forming Composition AGL-1)

| | |
|---|---|
| Smectite (Rucentite manufactured by Co-op Chemical Co., Ltd.) | 1.00 parts by mass |
| Crosslinking acryl-styrene particle (an average particle diameter of 2.5 μm and a refractive index of 1.52) | 8.00 parts by mass |
| Acrylate monomer (NK Ester A9550, manufactured by Shin-Nakmura Chemical Co., Ltd.) | 87.85 parts by mass |
| Irgacure 907 | 3.00 parts by mass |
| Leveling agent (SP-13) | 0.15 parts by mass |
| MIBK (methylisobutylketone) | 133.50 parts by mass |
| MEK (methylethylketone) | 16.50 parts by mass |

The solid concentration of the antiglare hard coat layer-forming composition AGL-1 was 40% by mass. Further, a resin particle and smectite were added in a dispersed form.

(Coating of Antiglare Hard Coat Layer)

The optical film 701 manufactured as described above was unwound from a roll form, then was coated, on its surface on which a low refractive index layer is stacked, with the above-described antiglare hard coat layer-forming composition AGL-1 by a die coating method using the slot die described in Example 1 described in Japanese Patent Application Laid-Open No. 2006-122889 at a conveying speed of 30 m/min, and dried at 60° C. for 150 seconds. Then, the coated layer was cured by irradiating with an ultraviolet ray at an illuminance of 400 mW/cm² and an irradiation dose of 180 mJ/cm² by using an air-cooled metal halide lamp with an output of 160 W/cm (manufactured by Eye Graphics Co., Ltd.) at an oxygen concentration of about 0.1% while further purging in the presence of nitrogen, and was wound. The coated amount was adjusted such that the film thickness of the antiglare layer reaches 6 μm.

The obtained optical film was designated as Optical Film 801.

<Manufacturing of Optical Film 802 to 805>

Except that the optical film 701 used to manufacture the optical film 801 was replaced by the optical film 702 to 705, an optical film 802 to 805 was manufactured in the same manner as in the optical film 701.

The moisture permeability of the optical film 801-805 manufactured as described above was evaluated by the same method as in the optical film 101. The results are listed in the table.

TABLE 7

| | Optical film sample No. | | | | |
|---|---|---|---|---|---|
| | 801 Example | 802 Comparative Example | 803 Example | 804 Example | 805 Example |
| Moisture permeability of low moisture-permeable layer (g/m²/day) | 67 | 94 | 67 | 68 | 68 |

From the results listed in Table 7, the following is clearly seen.

Like in a case where an antiglare hard coat layer is not stacked on a low moisture-permeable layer, it is also a preferred embodiment that an antiglare hard coat layer is stacked on a low moisture-permeable layer because an optical film that has a low moisture-permeable layer having a predetermined amount of (A) at least one of a compound having a cycloaliphatic hydrocarbon group and an ethylenically unsaturated double bond and a compound having a fluorene ring and an ethylenically unsaturated double bond and a predetermined amount of (B) a rosin compound has a lower moisture permeability than an optical film that does not.

Further, a case where an antiglare hard coat layer is stacked on a low moisture-permeable layer is given an antiglare property when compared to a case where an antiglare hard coat layer is not stacked.

According to the present invention, it is possible to provide an optical film with a reduced moisture permeability and a method of manufacturing the same. By using the optical film of the present invention, it is possible to provide a liquid crystal display device in which light leakage caused over time under a high-temperature high-humidity environment is prevented.

Although the present invention is described in detail and with reference to specific embodiments, it would be obvious to those skilled in the art that different modifications or changes may be made thereto without departing from the spirit and scope of the present invention.

The present application is based on Japanese Patent Application No. 2013-019006 filed on Feb. 1, 2013, Japanese Patent Application No. 2013-039688 filed on Feb. 28, 2013, and Japanese Patent Application No. 2013-091812 filed on Apr. 24, 2013, and the disclosure thereof is incorporated herein by reference.

The invention claimed is:

1. An optical film comprising:
a base film formed from a cellulose acylate or a (meth) acrylic polymer having at least one of a lactone ring structure, an anhydrous glutaric acid ring structure and a glutarimide ring structure in its main chain, and
a layer formed on the base film by curing a curable composition containing the following (A) in an amount of 50 to 99% by mass and the following (B) in an amount of 1 to 50% by mass, based on the total solid content of the curable composition when the total solid content of the curable composition is set to 100% by mass:
(A) at least one of a compound having a cycloaliphatic hydrocarbon group and an ethylenically unsaturated double bond and a compound having a fluorene ring and an ethylenically unsaturated double bond, and
(B) a rosin compound which has an acid number from 280 to 400 mgKOH/g,
wherein when the layer containing (A) and (B) has a film thickness of 10 μm, a converted moisture permeability of the layer containing (A) and (B) ranges from 5.0 to 100 g/m²/day,
the moisture permeability is a value obtained according to a method described in JIS Z-0208 after the lapse of 24 hours under a temperature of 40 ° C. and a relative humidity of 90%, the moisture permeability of the layer containing (A) and (B) and having a film thickness of 10 pm is calculated by the following Equation (2):

$$J_b \times d_b/10 \qquad \text{Equation (2)}$$

in Equation (2),
$J_b$ represents the moisture permeability of the layer when the optical film is separated into the base film and the layer containing (A) and (B), and
$d_b$ [μm] is a film thickness of the low moisture-permeable layer.

2. The optimal film as claimed in claim 1,
wherein the cycloaliphatic hydrocarbon group is represented by the following Formula (I):

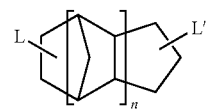

in Formula (I),
each of L and L' independently represents a di- or higher-valent linking group, and
n represents an integer of 1 to 3.

3. The optical film as claimed in claim 1,
wherein the rosin compound is at least one rosin compound selected from a rosin, a hydrogenated rosin, an acid-modified rosin, and an esterified rosin.

4. The optical film as claimed in claim 3,
wherein the rosin compound is an acid-modified rosin.

5. The optical film as claimed in claim 1,
wherein the optical film has a moisture permeability of 5.0 to 100 g/m²/day,
the moisture permeability of the optical film is a value obtained according to a method described in JIS Z-0208 after the lapse of 24 hours under a temperature of 40° C. and a relative humidity of 90%.

6. The optical film as claimed in claim 1,
wherein a moisture permeability of the layer containing (A) and (B) is from 5.0 to 100 g/m²/day,
the moisture permeability is a value obtained according to a method described in JIS Z-0208 after the lapse of 24 hours under a temperature of 40° C. and a relative humidity of 90%, and the moisture permeability of the layer containing (A) and (B) is calculated by the following Equation (1):

$$1/J_f = 1/J_s + 1/J_b \qquad \text{Equation (1)}$$

in Equation (1),
$J_b$ represents the moisture permeability of the layer when the optical film is separated into the base film and the layer containing (A) and (B), the moisture permeability of the optical film is denoted as $J_f$ and the moisture permeability of the base film is denoted as $J_s$.

7. The optical film as claimed in claim 1, further comprising a hard coat layer on the layer containing (A) and (B).

8. A polarizing plate comprising:
a polarizer, and
an optical film claimed in claim 1 as a protective film for the polarizer.

9. A liquid crystal display device comprising:
a liquid crystal cell and
the polarizing plate claimed in claim 8, which is disposed on at least one side of the liquid crystal cell,
wherein the optical film is arranged such that it becomes the outermost surface layer.

10. A method of manufacturing an optical film, comprising:
forming a base film from a cellulose acylate or a (meth) acrylic polymer having at least one of a lactone ring structure, an anhydrous glutaric acid ring structure and a glutarimide ring structure in its main chain, and
forming a layer on the base film by curing a curable composition containing the following (A) and (B):
(A) at least one of a compound having a cycloaliphatic hydrocarbon group and an ethylenically unsaturated double bond and a compound having a fluorene ring and an ethylenically unsaturated double bond in an amount of 50 to 99% by mass, based on the total solid content of the curable composition when the total solid content of the curable composition is set to 100% by mass, (B) a rosin compound having an acid number from 280 to 400 mgKOH/g, in an amount of 1 to 50% by mass, based on the total solid content of the curable composition, wherein when the layer containing (A) and (B) has a film thickness of 10 μm, a converted moisture permeability of the layer containing (A) and (B) ranges from 5.0 to 100 g/m²/day, the moisture permeability is a value obtained according to a method described in JIS Z-0208 after the lapse of 24 hours under a temperature of 40 ° C. and a relative humidity of 90%, the moisture permeability of the layer containing (A) and (B) and having a film thickness of 10 pm is calculated by the following Equation (2):

$$J_b \times d_b/10 \qquad \text{Equation (2)}$$

in Equation (2), $J_b$ represents the moisture permeability of the layer when the optical film is separated into the base film and the layer containing (A) and (B), and $d_b$ [μm] is a film thickness of the low moisture-permeable layer.

* * * * *